(12) United States Patent
Withers

(10) Patent No.: US 7,487,438 B1
(45) Date of Patent: Feb. 3, 2009

(54) METHOD AND APPARATUS FOR RECOGNIZING A DIGITIZED FORM, EXTRACTING INFORMATION FROM A FILLED-IN FORM, AND GENERATING A CORRECTED FILLED-IN FORM

(75) Inventor: William Douglas Withers, Crofton, MD (US)

(73) Assignee: Pegasus Imaging Corporation, Tampa, FL (US)

( * ) Notice: Subject to any disclaimer, the term of this patent is extended or adjusted under 35 U.S.C. 154(b) by 726 days.

(21) Appl. No.: 11/075,115

(22) Filed: Mar. 8, 2005

(51) Int. Cl.
G06F 3/048 (2006.01)
G06K 9/00 (2006.01)
G06K 9/18 (2006.01)
G06K 9/32 (2006.01)
G06K 9/34 (2006.01)

(52) U.S. Cl. ............... 715/223; 715/221; 715/222; 715/224; 715/225; 715/228; 382/151; 382/183; 382/171; 382/294; 382/170

(58) Field of Classification Search .......... 382/294; 715/221–225
See application file for complete search history.

(56) References Cited

U.S. PATENT DOCUMENTS

| | | | | |
|---|---|---|---|---|
| 4,651,288 A | * | 3/1987 | Zeising | 358/1.18 |
| 5,140,650 A | * | 8/1992 | Casey et al. | 382/283 |
| 5,231,510 A | * | 7/1993 | Worthington | 358/400 |
| 6,023,534 A | * | 2/2000 | Handley | 382/275 |
| 6,249,353 B1 | * | 6/2001 | Yoshida et al. | 358/1.9 |
| 6,289,120 B1 | * | 9/2001 | Yamaai et al. | 382/173 |
| 6,330,357 B1 | * | 12/2001 | Elmenhurst et al. | 382/175 |
| 6,741,738 B2 | * | 5/2004 | Taylor | 382/187 |
| 7,313,287 B2 | * | 12/2007 | Abramov | 382/251 |
| 2002/0076111 A1 | * | 6/2002 | Dance et al. | 382/229 |
| 2003/0198386 A1 | * | 10/2003 | Luo | 382/199 |
| 2004/0179734 A1 | * | 9/2004 | Obubo | 382/182 |

* cited by examiner

Primary Examiner—Brian Q Le
Assistant Examiner—Michelle Entezari
(74) Attorney, Agent, or Firm—Straub & Pokotylo; Michael P. Straub; Ronald P. Straub

(57) ABSTRACT

Methods and apparatus for comparing blank forms represented in a digital format to digitized filled-in forms are described. Different errors are attributed different weights when attempting to correlate regions of blank and filled-in forms. Foreground pixels in the blank form which are not found in a corresponding portion of a filled-in form are attributed greater error significance than foreground pixels, e.g., pixels which may correspond to added text, found in the filled-in form which correspond to a background pixel value in the blank form. A virtual filled-in form including content, e.g., pixel values, from the filled-in form is generated from the content of the filled-in form and pixel value location mapping information determined from comparing the blank and filled-in forms. Various analysis is performed on a block basis, but in some embodiments the final pixel mapping to the virtual form is performed on a pixel by pixel rather than a block basis.

25 Claims, 19 Drawing Sheets

200

| 2. ☐ VETERAN | ☐ RETIREE | ☐ NONVET | ☐ DOMICILIARY | ☐ NHCU |
|---|---|---|---|---|
| 3. ☐ INPATIENT | ☐ OUTPATIENT-OTHER | | OUTPATIENT-CLASS | |
| 4. SERVICE CONNECTED | ☐ DENTAL | ☐ MEDICAL | ☐ NEITHER | |
| 5. DENTISTRY ADJUNCT | ☐ YES ☐ NO | | | |
| 6. SCREENING EXAM DATE _____ | ☐ INITIAL ☐ CR ☐ SUBSEQUENT | | | |
| 7. DENTAL CARE NEEDED | EMERGENCY ☐ YES ☐ NO REGULAR ☐ YES ☐ NO | | | |
| 8. PREVENTIVE DENTISTRY ONLY | ☐ INSTRUCTION ☐ PROPHY ☐ TOPICAL FLUORIDE | | | |
| 9. REFER FOR COMPLETE EXAM AFTER SCREENING | ☐ YES ☐ NO | | | |
| 10. COMPLETE EXAM DATE _____ | ☐ INITIAL ☐ SUBSEQUENT | | | |
| 12. ORAL MALIGNANCY CONFIRMED DATE _____ | | | | |
| 14. OTHER FINDINGS OR REMARKS | | | | |

| 2. ☒ VETERAN | ☐ RETIREE | ☐ NONVET | ☐ DOMICILIARY | ☐ NHCU |
|---|---|---|---|---|
| 3. ☐ INPATIENT | ☒ OUTPATIENT-OTHER | ☐ OUTPATIENT-CLASS | | |
| 4. SERVICE CONNECTED | ☐ DENTAL | ☐ MEDICAL | ☒ NEITHER | |
| 5. DENTISTRY ADJUNCT | ☐ YES ☒ NO | | | |
| 6. SCREENING EXAM DATE 9/2/03 | ☐ INITIAL ☒ CR ☐ SUBSEQUENT | | | |
| 7. DENTAL CARE NEEDED | EMERGENCY ☐ YES ☒ NO REGULAR ☒ YES ☐ NO | | | |
| 8. PREVENTIVE DENTISTRY ONLY | ☒ INSTRUCTION ☐ PROPHY ☐ TOPICAL FLUORIDE | | | |
| 9. REFER FOR COMPLETE EXAM AFTER SCREENING | ☒ YES ☐ NO | | | |
| 10. COMPLETE EXAM DATE 9/2/03 | ☒ INITIAL ☐ SUBSEQUENT | | | |
| 12. ORAL MALIGNANCY CONFIRMED DATE | | | | |
| 14. OTHER FINDINGS OR REMARKS | | | | |

☐ YES ☒ NO

DATE 9/2/0

804

☐ YES ☒ NO

DATE 9/2/0

Figure 8

METHOD AND APPARATUS FOR RECOGNIZING A DIGITIZED FORM, EXTRACTING INFORMATION FROM A FILLED-IN FORM, AND GENERATING A CORRECTED FILLED-IN FORM

FIELD OF THE INVENTION

The present invention relates to the field of automated processing of forms and, more particularly, to methods and apparatus for aligning, matching, and/or classifying digital forms.

BACKGROUND OF THE INVENTION

In certain areas, like government, health care, human resources, and insurance, the daily processing of a variety of paper forms is a routine and important activity. The processing of a form often involves: the extraction of the information on the form supplied by the users; specific actions that are governed by the specific nature of the extracted information; and, possibly, the archiving of the extracted information and/or the form itself in a manner that facilitates subsequent use of the archival information. While all of these steps can, and often are, performed by a human, the processing of large number of forms on a timely basis can by means of digital computing devices would be desirable.

One common step in the automation of forms handling is the digitization of one or more forms by means of an appropriate scanning device. The result of the scanning process is a set of information representing the digitized form. The set of information is normally a rectangular array of pixel elements of dimensions W and H where the "width", W, is the number of pixels in each horizontal row of the array and the "height", H, is the number of pixels in each vertical column of the pixel array. The columns may be identified, for purpose of discussing such a set of information, by an index, I, whose values can range from 1 to W; and the rows can be identified by an index J whose values range from 1 to H where W, H, J and I are integer values. If a pixel array itself is labeled as P, then the value of a pixel in the column with index I and row with index J is labeled for discussion purposed as P(I,J). The ordered pair (I,J) is sometimes called the "address" or "pixel location" of this pixel. This is illustrated in FIG. 1. FIG. 1 includes an exemplary pixel array 100 in which column 1 102, exemplary column I 104, column W 106, row 1 108, exemplary row J 110, row H 112, and exemplary pixel location (I,J) 114 are identified.

While the particular colors that are used on forms can vary from application to application, most forms have only two distinguishing color features, the background color and the foreground color. It is common practice to set the values of all pixels representing the background color to the number 0, as illustrates with background pixels 116 in FIG. 1, and all pixels representing the foreground color to the value 1, as illustrated with foreground pixels 118 in FIG. 1.

The automatic determination of the type of a filled-in form is often the most basic step after the initial digitization step. Subsequently, automatic alignment of a blank form with a filled-in version of itself can enable the separation of annotations on the filled-in form from the form itself. This is often a prelude to subsequent processing of the annotations. An automatic alignment process can also be a step in automatic matching of forms.

Forms that are purely digital in the sense that they are generated and completed, or annotated, in the digital domain without being transformed into physical entities can be recognized and analyzed using software based on template matching methods, text recognition methods, and methods particular to the form and industry in which it is used since form lines and information locations are well defined and not subject to distortions which may occur from the use of paper forms, copies and/or scanning. Forms that are completed "on-line" or with word processing programs are examples of digital forms of this type. However, many forms are completed on paper and are scanned into digital form at a later time.

One method of identifying the type of a paper form which has been scanned is described by Bergelson, et al. in U.S. Pat. No. 6,697,054. The system described in U.S. Pat. No. 6,697,054 utilizes data derived from one or more identification marks made manually in pre-printed portions of the form. It compares this data with data of similar type residing in a database and on the basis of these comparisons identifies the type of the form. However, many forms in common use do not require such extraneous user input. In addition, such a requirement is subject to being ignored or completed erroneously.

A digitized embodiment of an annotated or filled-in form may differ from a digitized embodiment of the underlying blank, or unannotated, form by subtle local difference or perturbations that are not readily discernible to the human eye. Such perturbations can arise even to unannotated forms through the common processes of printing, faxing, photocopying, and handling of forms. For example, a slight misalignment of the paper form in the scanning process or a slightly warped sheet of paper in the process of printing the blank form can result in a paper form that differs little from the original when viewed by the human eye but whose digital embodiment is not bit-for-bit the same as the original form. For example, an insurance form transmitted by a facsimile machine to a patient may be photocopied by the patient who makes annotations to it, given to a physician who makes further annotations, and then faxed back to the insurance company. A digitization of the final form will to the human eye appear to have the same underlying form as the original. But a digital computer can have a problem just in aligning the forms.

FIGS. 2 and 3 illustrate a common problem that arises in the identification problem. FIG. 2 is an illustration 200 of an example of the digital representation of a blank form; its dimensions comprise a width of 3206 pixels and a height of 2467 pixels. FIG. 3 is an illustration 300 of an example of the result of at least the following operations having been applied to FIG. 2: (1) print it to paper, (2) fill it in with pen or pencil, and (3) scan the filled-in form. The dimensions of FIG. 3 comprise a width of 3237 and a height of 2469. Notice that the operations have caused the dimensions of these forms to differ and that FIG. 3 contains additional noise of unknown origin, possibly caused by the additional steps of photocopying or faxing.

Despite previous attempts to automate form recognition, there remains a need for form identification methods that can be applied to the diverse varieties of forms currently in use in that can be used to identify in an automated manner, which, if any, form in a database of blank forms is the form underlying a given filled-in, or annotated, paper form.

SUMMARY OF THE INVENTION

This invention discloses an automated process for aligning two digitized forms when one is a blank form and the other is an annotated version of the given blank form. It is assumed that the blank form is taken from a collection of such forms and that certain statistical features of the blank form are known. One important implementation of the process is the situation in which a filled-in, or annotated, form of unknown type is submitted to the process and the process attempts to align each of a number of blank forms with the filled-in form.

More specifically, given a filled-in form and a blank form the invention maps the content of the filled-in form to a virtual form based on mapping information determined from an analysis, e.g., comparison using various statistical techniques, of the content and location of foreground pixels in the blank and filled-in forms. A foreground pixel is used to indicate a line or text, while a background pixel represents a pixel that correspond to a blank and thus background color pixel. The virtual form is aligned with the blank form and includes a copy of the annotations on the given annotated, e.g., filled-in form which is subject to processing in accordance with the invention. The annotations and mapping information can be stored for use in creating the virtual form as need.

Thus, a virtual filled-in form is generated based on both the content of both the filled-in form being processed and on the content of the blank form. The virtual form pixel locations match those of the blank form. Thus, the blank form provides the basis for the pixel locations of the virtual form and the content of the filled-in form alone or in combination with the content of the blank form, provides the pixel values used in the virtual filled-in form. An important feature of the invention is the fact that the virtual form is constructed to be in alignment with the blank form. This feature enables subsequent extraction of annotations from the blank form and analysis of them without the concern for misalignment on the form of the data to be extracted.

In various embodiments, the virtual filled-in form is generated so as to include the content found on the filled-in form while excluding the content of the blank form. Thus, the text which was added to a blank form is extracted and used to create the virtual filled-in form. The information extracted from the filled-in form is shifted in location by an amount determined from a comparison of the blank and filled-in form thereby correcting for distortions which may exist in the filled-in form due, e.g., to resizing or copying prior to entry of the information on the filled-in form. The position shift performed on a portion of the filled-in form, e.g., one or more pixel values, as part of the virtual form generation process, is performed in some embodiments, based on a global shift and one or shifts determined for smaller image units, e.g., blocks. Thus, the information on different portions of the filled-in form may be shifted by different amounts when being included on the virtual filled-in form. In fact, in some implementations it is possible for two pixels of the filled-in form to be mapped to the same pixel of the virtual form which is being generated. In such a case, the pixel values mapping to the same location of the virtual form may be combined, e.g., XORed, or the second pixel value mapped to the location in the virtual form can replace the previously mapped pixel value.

In one embodiment, the virtual filled-in form is generated so that the lines and other information on the blank form are omitted from the virtual filled-in form which is generated from the filled-in form. This can be done by including foreground pixel values found on the filled-in form in the virtual form at the location to which they map when a background pixel of the blank form corresponds to the location to which the pixel is being mapped. In other cases the pixel in the virtual form will be treated as a background pixel. Thus, if the blank form and filled-in form both include foreground pixels which correspond to the same particular location in the filled-in virtual form, the pixel value in the virtual filled-in form at the particular location will be that of a background pixel value. Similarly, if the blank form includes a foreground pixel value at a particular location and the filled-in form includes a background pixel at a location which corresponds to the particular location, the pixel value in the virtual filled-in form at the particular location will be that of a background pixel value. In such an embodiment, the content of the blank form will be excluded from the filled-in virtual form. In one such embodiment, the pixel values and other data representing the filled-in virtual form generated in accordance with the present invention is stored with information identifying the blank form to which the generated virtual form corresponds.

When a user of a system desires to view or use a virtual filled-in form, a completed virtual filled-in form can, and is, generated in some embodiments by combining a blank form with the stored virtual filled-in form. Thus, in some embodiments, a virtual filled-in form is retrieved from storage, the pixel values are combined, e.g., XORed, with those of the blank form indicated to correspond to the virtual filled-in form, and the results displayed and/or printed. In this manner, the content of the blank form can be stored once and omitted from the stored virtual filled-in form but can be recombined when the completed form needs to be viewed or otherwise used. This can provide more efficient storage of filled-in form information than embodiments where the blank form contents are stored as part of the virtual filled-in form since only one copy of the blank form need be stored for numerous filled-in forms corresponding to the particular blank form.

While in some embodiments the contents of the blank form are intentionally omitted from the virtual filled-in form, in other embodiments such information is not omitted and the virtual filled-in form which is generated and stored includes content from both the blank and filled-in form with the content of the filled-in form being mapped to the virtual form in accordance with the method of the present invention providing a filled-in virtual form having the same dimensions as the blank form.

As part of the virtual form generation process, a plurality of blank forms can be evaluated as matches to the filled-in form which is to be processed. The process of constructing the virtual form modeled on the blank and filled-in form has the feature that, at different steps, tests are applied to assess the probability that the blank form accesses to the filled-in form. The outcome of these tests determines whether the process of constructing a virtual form continues or terminates, e.g., due to a form match mismatch. The process is halted if it determines that the annotated form is not based on the given blank form. In this way the invention is applicable to the problem of identifying, automatically by digital computer, the type of a given annotated or filled-in form. Given a list or database of blank forms and an annotated form whose specific underlying form is unknown, but whose underlying form is known or suspected to be one of the types in the database of blank forms, an operator of the invention can apply the invention in a way that it attempts to align each blank form in the database with the given filled-in form. In this way, blank forms that cannot be aligned can be eliminated from further consideration often early in the process.

The methods of comparing blank and filled-in forms to determine if they match can be used along or in combination with the virtual form generation steps of the present invention. Accordingly, while described in the context of generating virtual digital forms, the form comparison techniques can be used in a wide variety of applications where there is a need to determine if two forms match and/or to generate a numerical estimate of whether two forms match.

Some of the blank form evaluation tests that the invention utilizes are based on meta or global characteristics or properties of the forms. Metadata based on statistical properties of digital images is a common tool in the area of content based image indexing and retrieval. For example, many applications of color features of images in this area have their roots in the seminal paper of Swain and Ballard (M. Swain and D. Ballard, "Color Indexing", International Journal of Computer Vision, 7:1, 1991, pp. 11-32). Metadata that this invention may employ, depending on the embodiment, includes normalized histograms based on the marginal distributions of foreground pixels; a notion of main image portion width also referred to herein as "essential width" of a form. The essential width is determined in some embodiments by determining the horizontal width in terms of columns, in which a predetermined majority of the forms foreground pixels are located. In some particular embodiments, the main image portion width is calculated as the minimal extent of column indices of the form for which a large percentage (e.g., 31/32) of the foreground pixels lie in the columns.

A notion of major image portion height also referred to herein sometimes as "essential height" may be determined in a similar manner to the way in which the main image portion height is determined. The essential height is determined in some embodiments by determining the vertical width in terms of rows, in which a predetermined majority of the form's foreground pixels are located. The predetermined majority of the form's foreground pixels used to determine essential height may be the same as, or different from, the predetermined majority of the form's foreground pixels used to determine the essential width.

A main image aspect ratio, also referred to herein sometimes as an "essential aspect ratio", can be computed as the ratio of a form's "essential width" to the form's "essential height". In some embodiments essential aspect ratios are used as a plausibility test early in the process to eliminate blank forms from consideration whose aspect ratio is substantially different, e.g., outside a predetermined difference threshold, from that of the given filled-in form. The predetermined difference threshold may be some predetermined value that is expressed in the same units as the essential aspect ratio. Since a blank form can be eliminated because of an incompatible aspect ratio, it is useful in applied embodiments of the invention to consider rotations of the blank form by 90, 180, and 270 degrees in order not to eliminate a correct blank form on the grounds that the filled-in form was scanned in an incorrect orientation. The details of treating rotated versions of images such as filled-in forms are well understood in the art of digital software programming and will not be addressed in the remainder of this document.

One novel aspect of the invention is that it constructs scaling functions from the indices underlying the histograms of the blank form to the indices underlying the histograms of the filled-in form by considering, not all indices, but only those indices that account for a pre-selected amount, e.g., 25% (12.5% at each end of the histogram) of the mass of the histogram. The mass of a histogram is the sum of the values of all of its indices. This method allows not only for the rapid comparison of the respective histograms, but also for the early elimination of blank forms incompatible with the given filled-in form. It is to be noted that the figure of 25%, while used in a specific embodiment of the invention, can be adjusted for particular purposes. For example, a smaller number could be used to make the process faster at the expense of possibly reducing the accuracy and allowing incompatible forms to continue on into the more computationally intense steps of the process or perhaps eliminating a good match.

For blank and filled-in forms which are determined to match, assuming relatively little reduction or enlargement of the filled-in form to the blank form, the determined scaling factor will normally be relatively small, e.g., the scaling factor will be approximately 1 (and in many actual cases is likely to be in a range of, e.g., 1 to 1.1).

The early steps of the form recognition process of the invention include, in some exemplary embodiments the construction of normalized marginal histograms of the filled-in form; the extraction of the essential aspect ratio from these histograms; the comparison of the essential aspect ratios of the filled-in form and the blank form with the possible termination of the process; the determination of an approximate distance between histograms based on the filled-in and blank forms and the construction of a simple scaling relationship between the histograms; a redefinition of the essential width and height of the filled-in form, based on the scaling relationship; the testing of the compatibility of the blank and filled-in forms based on the computed distance between them and/or the determination of a scaling ratio between the blank form and the filled-in form.

Another novel feature of the invention is the construction, in some embodiments, of a virtual form on which not only foreground pixels of the filled-in are non-zero, but also neighboring pixels are non-zero according to a scheme in which the proximity of a pixel to a foreground pixel increases the value of the pixel making it closer in color to the foreground pixel and/or changing the pixels value to that of a foreground pixel. This virtual form, called a "fattened" form in this application, allows for the quantification of errors between a blank form and the filled-in form that might have been caused by slight misalignments or loss of foreground color during copying. The construction of the filled-in form may occur at many points in the process or may occur concurrently with the early steps discussed in the preceding paragraph.

One feature of the invention is directed to a process that defines a pixel location transformation (mapping) between the blank form and the filled-in form. The mapping may use scaling relationships and does use offset parameters determined in accordance with the invention by comparing the content of the blank and filled-in forms. This process normally occurs once one or more of exemplary steps outlined previously have occurred. At the mapping stage, in some embodiments, the process will have previously constructed a transformation between the pixel locations on the blank form and pixel locations on the filled-in form. In some embodiments, this transformation has the simple form:

$$X = SCALEX * I + XOFFSET$$

and $$Y = SCALEY * J + YOFFSET$$

where (I,J) is a pixel location on the blank form and (X,Y) is pixel location on the filled-in form.

This transform may be used through an entire form, subject to additional optional localized corrections discussed below. Thus, this transform may be considered a global transform.

If for some locations, (I,J), on the blank form, the corresponding (X,Y) are not valid locations on the filled-in form, e.g., in the case of border or edges outside the main image region, the (X,Y) is simply ignored in some embodiments since such locations are rare and typically occur near the edge of the form and are not usually critical to the analysis of the entire form and generation of a virtual filled-in form.

In some exemplary embodiments, the final steps of the automated form processing methods involve the utilization of a block structure on a blank form to construct a local (e.g., restricted to each block of the scanned form, correction to the global transformation, e.g., corrections defined over the entire blank form. Given a partitioning of the blank form into non-overlapping rectangular blocks that form a rectangular array themselves. The method may involve constructing for each block a pair of numbers, (TX, TY), with certain constraints on their range of values. The pair is chosen so that the total error between the given block on blank form and its corresponding block on the filled-in form is minimal. FIG. 9 illustrates the overall control structure of the processing of one row of blocks during this construction. At certain places in the process the process can halt because the process found either that the number of a certain type of error was becoming too large or that no allowed translation yielded a reasonable error. The term "reasonable" is quantified by the use of threshold parameters, which may depend on the number of pixels in the block being processed. Once or more predetermined threshold parameters can be stored and used during processing to determine if a mismatch between the blank and filled-in form exits and processing should be halted.

Another feature of the exemplary method used in one embodiment is that blocks on the blank form that have no foreground pixels can be processed very quickly, without the need to make any pixel by pixel comparisons. In some embodiments, before each block is processed the range of allowed translations for that block is revised by requiring, if necessary, that that the minimal allowed translation be not smaller than one less than the minimal allowed translations of any of the neighboring blocks that have been processed. Similarly the maximal allowed translation may be forced to be no larger than one more than the translation of the neighboring blocks that have been processed. For example, after the first row has been processed, the ranges of allowed translations for all blocks in that row may be revised by taking into account the allowed range of the translations of only the block to the left. At this stage, the row is processed in right to left order in one exemplary embodiment which will be discussed below with regard to FIG. 9. After this each the range of translations of each block has a value that takes into account the ranges of the blocks to the left and to the right. After the second row has been processed, the ranges of translations for each block will have been influenced by the ranges of the blocks to the left, to the right, and above. Finally, when the last row has been processed, in some embodiments, the ranges of the allowed translations are further restricted by requiring that they differ from the range of the translations of the block below by no more than a predetermined maximum amount. Exemplary restriction in this manner will be discussed below with regard to FIG. 12.

After the blocks of a form have been processed: each row left to right and right to left and each column, bottom to top, the process has at its disposal for each block: smallest and largest allowed translation e.g., values (corrective change values in the forms of pixel position offsets), TX and TY, for that block and a table of errors made by each translation.

In the final steps of the exemplary method, the construction involves first the iterative refinement of the optimal block translation by weighing not only the error made with the translation, but also the deviation of the translation from the best translations of its neighbors. These measurements are quantified and revised in an iterative cycle. After this final determination of the best translation, a confidence factor is calculated. If the confidence factor is sufficiently high, the process constructs a virtual form pixel by pixel, e.g., by utilizing a bilinear interpolation formula in which the values of pixels on the transformed screen are taken to be an interpolation of values given by the local transformations on blocks that border the block in which the given pixel location is.

Concerning the error nomenclature used in describing various examples, the total error is a weighted sum of four types of errors: TYPE-2 Errors occur at a foreground pixel location (I,J) on the blank form if the filled-in form is not a foreground pixel or close to a foreground pixel at the corresponding point (X,Y), given by the formula above, on the filled-in form. This is, arguably, the worst type of error, for a filled-in form modeled on a blank form should have foreground pixels where the blank form has foreground pixels. In this case the total error is given a high weight. There are two kinds of TYPE-1 ERRORs: if (I,J) is a foreground pixel and if (X,Y) is close to, but is not itself, a foreground pixel, then the error is weighted according to how far away (X,Y) is to a foreground pixel; if (I,J) is a background pixel and (X,Y) it is a foreground pixel, the error is weighted with a small weight, for this behavior is to be expected at pixels on the filled-in form that represent annotations to the blank form. An exemplary method of calculating the error between a block on the blank form and a corresponding set of pixels in the filled-in form, e.g., a corresponding transformed block on the filled-in screen will be described below in detail below with respect to FIG. 10.

Numerous additional features, benefits and embodiments of the invention will be discussed below in the detailed description.

BRIEF DESCRIPTION OF THE DRAWINGS

FIG. 2 is an example of a digitized blank form.

FIG. 3 is an example of a digitized filled-in form.

FIG. 8 depicts an example of a form prior to fattening and the resulting fattened form.

DETAILED DESCRIPTION

Figure 1:
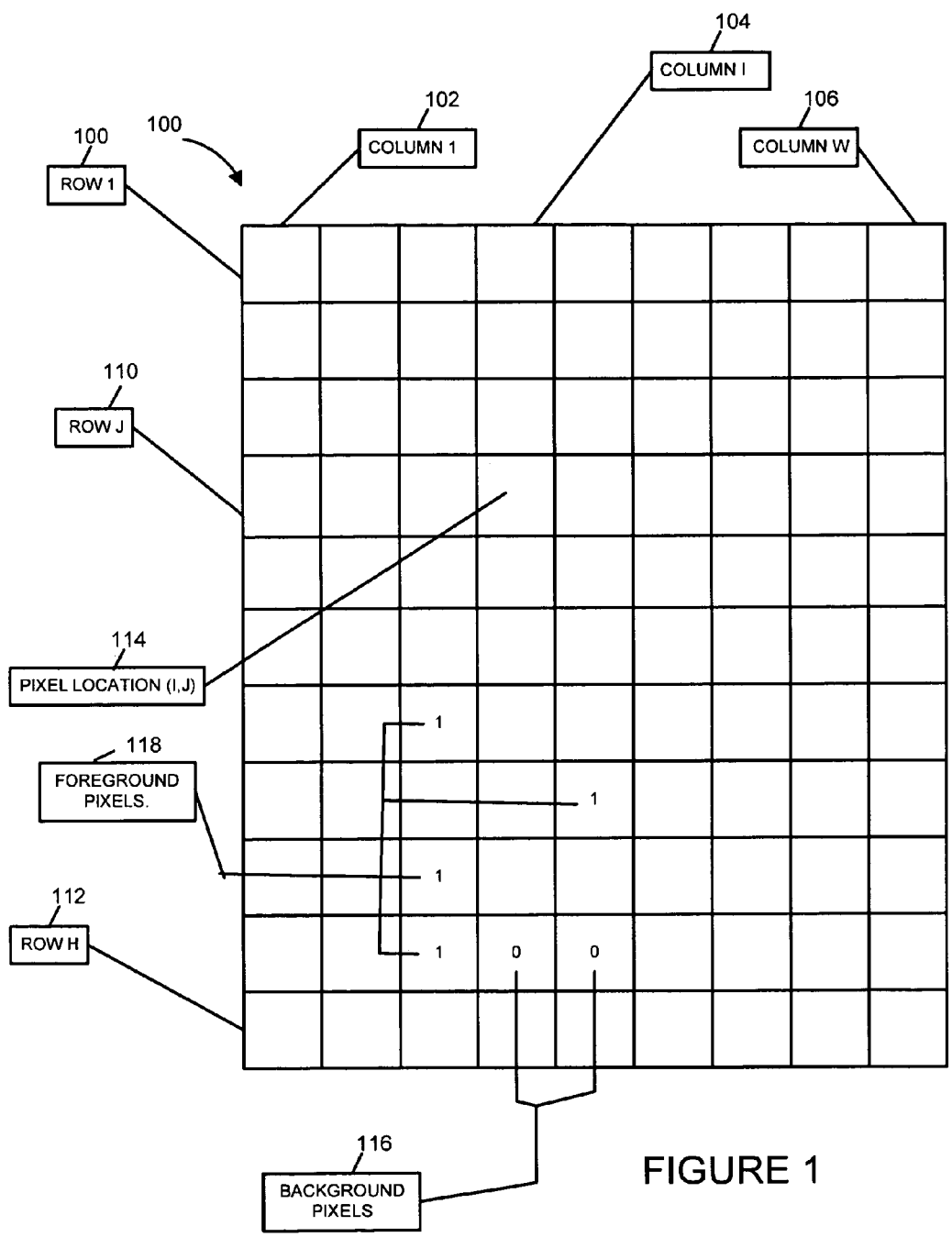
FIG. 1 illustrates the layout of a rectangular pixel array.
Figure 4:
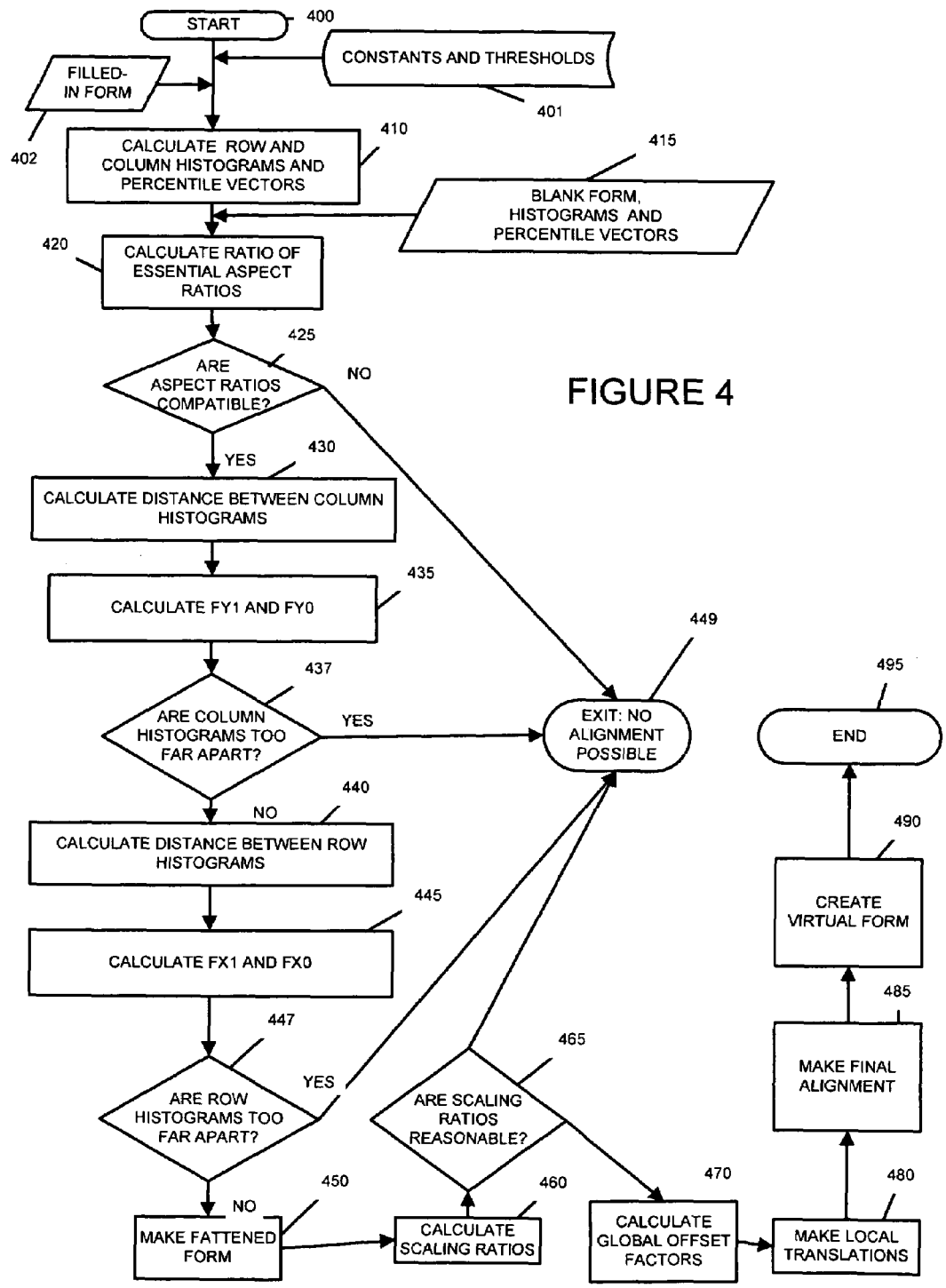
FIG. 4 depicts an exemplary embodiment of the invention.

FIG. 4 depicts an exemplary embodiment of the invention. The process starts in step 400.

Step 401 represents the specification of parameters whose values do not change throughout the process. These can be fixed as constants in the computer program that governs the process or can be read from a configuration file or stored memory at the start of the process. In the preferred embodiment these constants include ASP_TOL, a threshold for aspect ratios; IPULL and OUTPULL, flexibility factors used in the process of comparing histograms; WEIGHT, a base weight used in calculating errors; TYPE1_THRESHOLD and TYPE2_THRESHOLD, error thresholds; HIST_MASS, the common mass of each of the histograms dealt with in the process; MIN_SUM, a large constant used to initialize variables whose minimal value is being calculated; HIST_THRESH, a threshold for histogram errors; NBHD_RAD, the largest offset displacement allowed for local translation operators; IT_MAX, the number of iteration steps used in optimizing the choice of local translation factors; FLEX, a flexibility factor used in specifying the range of values allowed for translations; and others. While these values do not change during the process, it is possible to configure them for special purposes.

In step 402 the digitized annotated or filled-in form is taken as input to the system. This input will be in the form of a rectangular array of pixels $F(I,J)$ where J denotes the row index which ranges from a value of 1 to a value of HF; I denotes the column index which ranges from a value of 1 to a value of WF; and $F(I,J)$ denotes the value of the pixel at address $(I,J)$. The possible values of $F(I,J)$ are 0, which indicates background, and 1 which indicates foreground or printing. While it is common to think of 0 as denoting white and 1 as denoting black, the specific color representation is irrelevant in this invention.

The width and height values of WF and HF, respectively, are related to the size of the digitized input image and may not faithfully represent the width and height of the actual filled-in form. In step 410 the process calculates normalized row and column histograms for the filled-in form and extracts from them the locations of the rows and columns at which the 0, $\frac{1}{64}$, $\frac{1}{8}$, $\frac{7}{8}$, $\frac{63}{64}$, and 1.00-percentiles occur.

Figure 5:
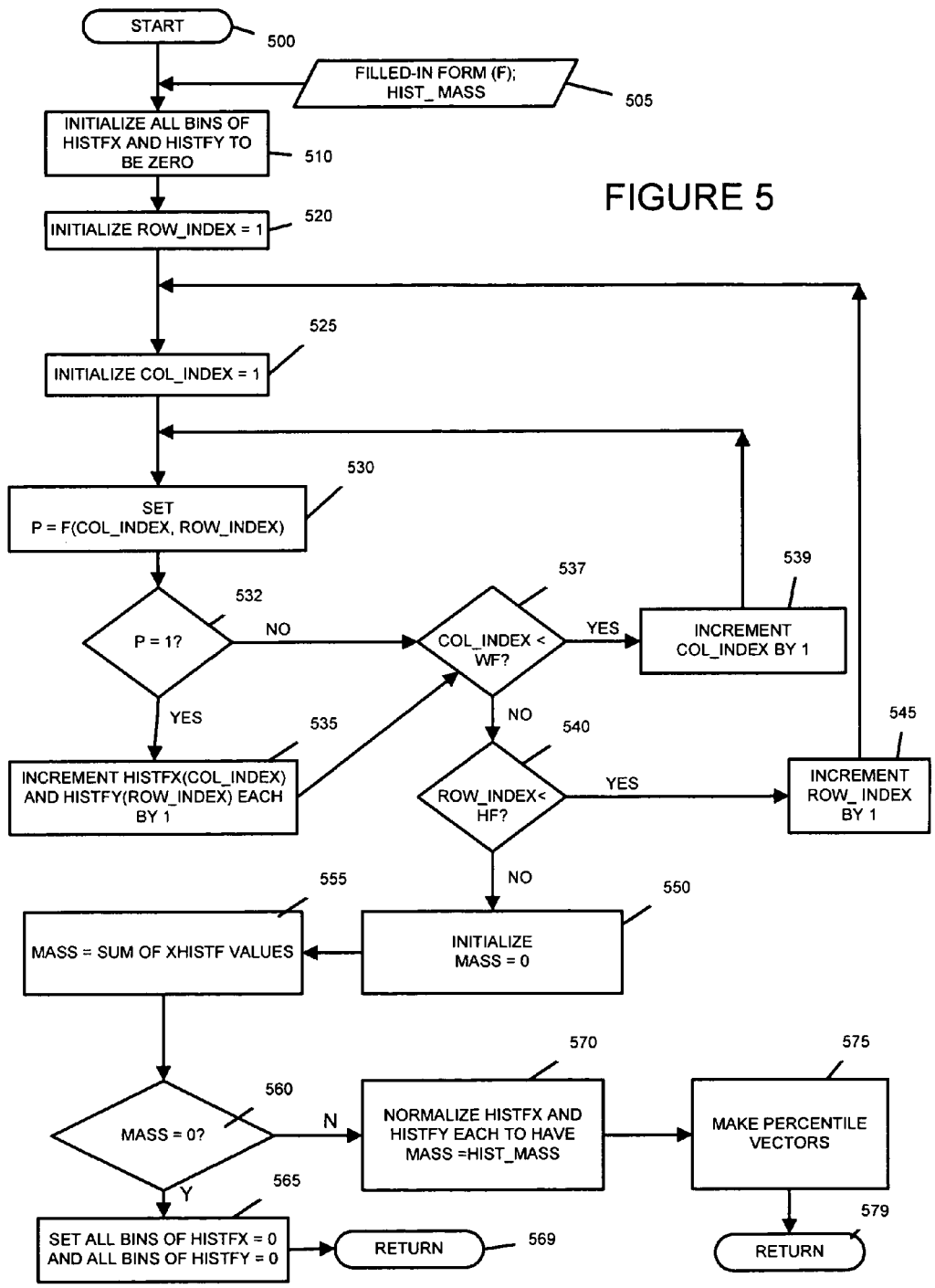
FIG. 5 depicts the methods of creating normalized row and column histograms and of calculating percentile vectors.

The row histogram is a vector, denoted by HISTFX, consisting of a number of coordinates equal to WF, the width of the filled-in form, in which the value of HISTFX[I], the $I^{th}$ coordinate, or $I^{th}$ "bin" of HISTFX, is equal to the number of pixels of value 1 in the $I^{th}$ column of the filled-in form, F. Similarly, the column histogram is a vector, HISTFY, having HF coordinates in which the value of HISTFY[J] is equal to the number of pixels in the $J^{th}$ row of F having a value of 1. It is clear that the sum of the values of all of the coordinates of HISTFX is equal to the sum of the values of all of the coordinates of HISTFY. The common value is called the "mass" of the histograms and is denoted by MASS. Step 410 is represented in more detail by the flowchart of FIG. 5. Operation starts in step 500; filled-in form (F), entered the process in step 402, and HIST_MASS entered in step 401. The method of forming the histograms and MASS is depicted in steps 510-555 (steps 510, 520, 525, 530, 532, 535, 537, 539, 540, 545, 550, and 555).

In order to facilitate the comparison of these histograms with histograms of other forms, it is convenient to normalize the mass of each histogram to one common value. This common value is the constant HIST_MASS introduced in step 401. The normalization is effected by multiplying each coordinate by HIST_MASS/MASS and is depicted in step 570. The case of a form having no foreground is treated in steps 560, 565, and 569.

Step 575 depicts the process of constructing vectors PFX and PFY whose coordinate values are the index values for which the histograms HISTFX and HISTFY, respectively, attain certain percentile values. For a given number, Z, greater than or equal to 0 and less than or equal to 1, the Z-percentile location in a histogram is the largest integer, K, with the property that the sum of the entries of all bins with indices less than or equal to K exceeds Z times the mass of the histogram. The vector extracted from HISTFX, the row histogram of the filled-in form, is denoted by PFX. Its coordinates are PFX[0], PFX[1], PFX[2], PFX[3], PFX[4], PFX[5]. These correspond to the 0-percentile, $\frac{1}{64}$-percentile, $\frac{1}{8}$-percentile, $\frac{7}{8}$-percentile, $\frac{63}{64}$-percentile, and 1-percentile, respectively. The vector extracted from the column histogram is denoted by PFY; its coordinates have similar meanings. Since $\frac{62}{64}$ of the foreground pixels on the filled-in form lie between coordinates PFX[1] and PFX[4], the main image portion width, also referred to herein as the "active width" of the filled-in form is defined to be PFX[4]-PFX[1]. Similarly, the main image portion height, also referred to herein as the "active height" is defined to be PFY[4]-PFY[1]. The "active aspect ratio" of the filled-in form is defined to be the ratio (PFX[4]-PFX[1])/(PFY[4]-PFY[1]).

In step 415, a blank form, B, with pixel values $B(I,J)$, is introduced into the process. The blank form may be prescribed by an external operator of the process or it may be resident in a database that the process is searching. Having been precomputed by a previous application of the method of step 410 or by another method, the normalized row and column histograms of the blank form, denoted by HISTBX and HISTBY, respectively, and the associated percentile vectors, PBX and PBY, are also input at this step. While the normalized histograms for the blank form have mass HIST_MASS and the percentile vectors record the locations of the identical percentile locations as do the vectors for the filled-in form, the width and height of the blank form, BW and BH, need not equal their filled-in frame counterparts, FW and FH. The "active width", "active height" and "active aspect ratio" of the blank form are defined similarly to those of the filled-in form. In particular, the active aspect ratio is (PBX[4]-PBX[1])/(PBY[4]-PBY[1]).

In step 420, the quotient of the active aspect ratio of the filled-in form, AF, with the active aspect ratio of the blank form, AB, is computed. In step 425 this quotient and its reciprocal are compared to ASP_TOL, the aspect ratio tolerance factor introduced in step 401. If the quotient is greater than the constant ASP_TOL, or if the quotient is less than the reciprocal 1/ASP_TOL, the aspect ratios are deemed to be not compatible and the process is terminated in step 449. In the preferred embodiment, the value of ASP_TOL is set to 11/8.5.

If the active aspect ratios are compatible, the process proceeds to step 430 in which a distance between the column histograms of the blank and filled-in form is calculated and step 435 in which the essential width of the filled-in form is revised. In step 437 the distance found in step 430 is compared to HIST_THRESH, introduced in step 401. If the distance exceeds HIST_THRESH, the process proceeds to step 499 and terminates on the grounds that the disparity in the column histograms preclude any possibility of a good alignment between the forms. If the distance does not exceed HIST_THRESH, operation proceeds from step 437 to step 440.

In steps 440-447 (440, 445, 447), the row histograms are processed in a similar manner to the processing of the column histograms as previously described with respect to steps (430, 435, 437), respectively.

Figure 6:
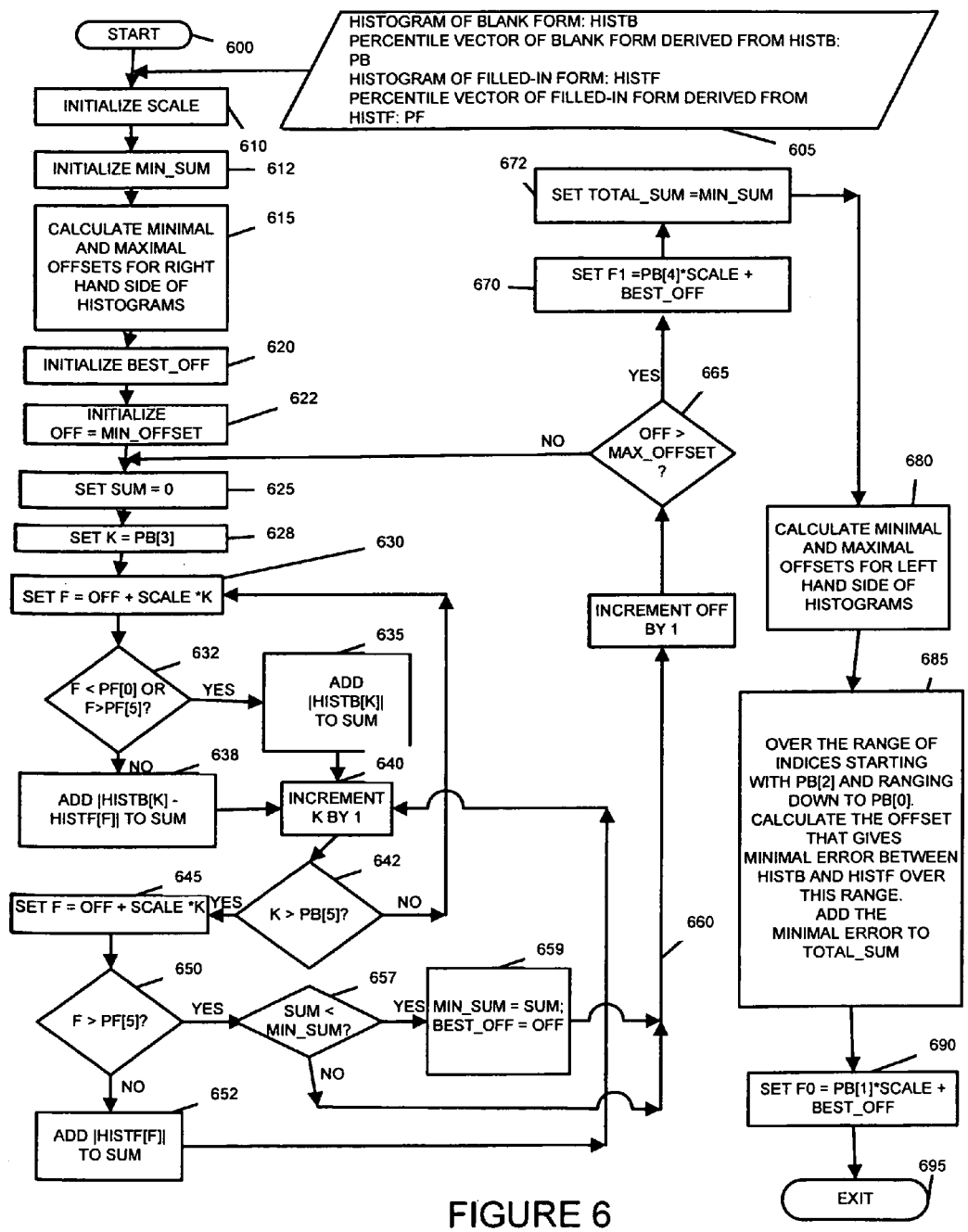
FIG. 6 depicts the method of calculating the distance between two histograms.

FIG. 6 depicts the method of calculating the distance between two histograms based on different forms employed in steps 430 and 440. While both histograms will have the same mass, they will not necessarily have the same number of coordinates. Also, their first and last non-zero coordinates may not have the same index. An important goal and consequence of the method of the distance calculation is the determination of a scale factor, SCALE, and an offset factor OFFSET such that the indices of the histograms for the blank form and the filled-in form, HISTB and HISTF, respectively, are reasonably correlated through the rule: HISTF[SCALE*K+OFFSET]=HISTB[K]. In the context of the method of FIG. 6, HISTB and HISTF will be either HISTBX and HISTFX, respectively, or HISTBY and HISTFY, respectively.

In step 605 the histograms, HISTB, for the blank form, and HISTF, for the filled-in form are introduced into the process. These histograms should be either both row histograms or both column histograms. Also, introduced into the process are the associated percentile vectors PB, for the blank form, and PF, for the filled-in form. In the case of steps 430-435, these percentile data will all refer to rows; in the case of steps 440-445, these data will all refer to columns.

Step 610 initializes the variable SCALE to (PF[4]−PF[1])/(PB[4]−PB[1]). SCALE is the ratio of the number of pixels occupying the middle $^{62}/_{64}$ of the filled-in form to the number of pixels occupying the middle $^{62}/_{64}$ of the blank form.

Step 612 initializes the variable that tracks the error between HISTB and HISTF to MIN_SUM. In one embodiment MIN_SUM is taken to be $2^{24}$ *or* 2 raised to the 24$^{th}$ power; however, any number greater than the number of pixels in the any form being processed is a reasonable choice.

If the filled-in form were a simple scaling of the blank form, the product of SCALE with any coordinate of the percentile vector PB would yield the corresponding coordinate of PF. For example, SCALE*PB[3] would equal PF[3]. In general, the forms are not simple scalings of each other. A better alignment between the forms requires at least that a translation offset be included in any formula that relates the histograms HISTB and HISTF. That is, a formula of the form PF[K]=SCALE*PB[K]+OFFSET where OFFSET is well chosen and does not depend on the particular value of K would give a better fit. The method of step 615 derives candidates for minimal and maximal offset values by calculating the discrepancies between each the three coordinates on the right half of PB and the corresponding coordinates of PF. This method initializes the largest and smallest discrepancies in the variables MAX_OFFSET and MIN_OFFSET using the formulas:

MAX_OFFSET=MAXIMUM(*PF[3]*−SCALE**PB [3]*,*PF[4]*−SCALE**PB[4]*,*PF[5]*−SCALE**PB [5]*)+OUTPULL and MIN_OFFSET=MINIMUM(*PF[3]*−SCALE**PB[3]*, *PF[4]*−SCALE**PB[4]*,*PF[5]*−SCALE**PB[5]*)− INPULL.

The constants INPULL and OUTPULL, introduced in step 401, allow for some flexibility in searching for the optimal offset.

In steps 620-665 an error function is evaluated for each possible offset value, OFF, between MIN_OFFSET and MAX_OFFSET. The variable BEST_OFF is initialized to MIN_OFFSET−1 in step 620 and the variable OFF is initialized to MIN_OFFSET in step 622. The value of OFF is incremented in step 660. In steps 625-659 the error function is evaluated for a particular value of OFF. In the method of steps 625-665 BEST_OFF is modified to become the particular value of the offset that yields the smallest error. This is accomplished during the final application of step 659. A variable SUM, initialized in step 625, holds the accumulated error for a given offset.

The error calculation, which takes place in steps 635, 638, and 652 is based on the so-called L__1 metric: the sum of the absolute values of the differences between HSTB[K] and HISTF[F], where F is defined in step 630 to be SCALE*K+OFF, are added to SUM for all indices K initialized in step 628 to the value PB[3] and ending with K=PB[5], with the exception that for any index, K, which yields a value of F that is greater than PF[5] or less than PF[0] (step 632) the value of SUM is increased by the absolute value of HISTB[K] (step 635). The variable SUM may be further increased if there are indices K>PB[5] for which the corresponding values of F, as given in step 645, do not exceed PF[5], the possibility of which is tested in steps 642, 645, and 650. In this case SUM is increased by the absolute values of HISTF[F], as depicted in step 652. After processing each of the values of K for a particular offset, the value of SUM is compared to the value of MIN_SUM, which contains the smallest observed value of SUM. If the value of SUM is smaller than MIN_SUM, then, in step 659, MIN_SUM is redefined to be SUM and BEST_ OFF is redefined to be the present value of OFF.

Step 665 depicts the fact that the last offset for which the error is calculated is MAX_OFFSET. It is to be noted that a particular feature of the method is that the calculation of step 615 which reduces the set of offsets that will be considered is an important practical consideration in the implementability of the process. Furthermore, it is to be noted that step 615 makes strong use of the percentile vector PB.

In step 670 the variable F1 is set to the value of SCALE*PB [4]+BEST_OFF as determined in steps 620-665. In step 435 this will be set to FX1 and in step 445 it will be set to FY1.

In step 672 the variable TOTAL_SUM is initialized to the value MIN_SUM as last set in step 659. In step 680, the minimum and maximum offsets for the left-hand side of histograms are calculated. In step 685 TOTAL_SUM will be increased by the smallest error observed in calculating an optimal offset for the left-hand side of the HISTB. In this case the indices, K, start from PB[2] and decrease down to the value PB[0].

A novel feature of the invention is that the total error between the histograms for the blank form and for the filled-in form is never calculated. Rather calculations are restricted to the range of indices no less than PB[3] in steps 612-665 and the range of indices no greater than PB[2] in steps 680-695. In this way only a fraction of all possible bin to bin comparisons are made.

Steps 680-695 replicate this process on the left-hand side of the histograms:

MAX_OFFSET=MAXIMUM(*PF[0]*−SCALE**PB [0]*,*PF[1]*−SCALE**PB[1]*,*PF[2]*−SCALE**PB [2]*)+OUTPULL and MIN_OFFSET=MINIMUM(*PF[0]*−SCALE**PB[0]*, *PF[1]*−SCALE**PB[1]*,*PF[2]*−SCALE**PB[2]*)− INPULL.

The control structure for step 685 for the determination of the error and best offset parallels that of steps 620-665 and is discernible to those skilled in the art of computer programming.

Step 690 depicts the assignment of the value SCALE*PB[1]+BEST_OFF to the variable F0. In step 435 this will be set to FX0 and in step 445 it will be set to FY0. By "the main horizontal extent" of the filled-in histogram, as noted in step 435, is FX1-FX0 and the "main vertical extent" as noted in 445 is FY1-FY0. These replace PFX[4]-PFX[1] and PFY[4]-PFY[1] as indicators of the width and height of the filled-in form.

In step 695 the values of TOTAL_SUM and BEST_OFF as calculated in step 685 are returned to the main process as well as the values F0 and F1.

In step 437, the distance calculated in step 430 and returned as TOTAL_SUM by the method of FIG. 6 is compared to the constant HIST_THRESHOLD. If the distance exceeds the threshold, the process terminates in step 449. If the distance does not exceed the threshold, the process proceeds to steps 440-447 in which the distance between the row histograms is calculated and compared to a threshold and in which the vertical extent is defined. In step 447, the error calculated in step 440 is compared to HIST_THRESOLD. If the distance exceeds the threshold, the process terminates in step 449. If the distance is less than HIST_THRESH, the process continues to step 450.

In step 450 the process constructs, from the filled-in form, a virtual form of the same dimensions as the filled-in form on which foreground pixels have the value 7 and pixels within one or two pixels of a background pixel have a non-zero value. This form, called the "fattened" form allows for the calculation of differences between the blank form and the filled-in forms in a manner that weighs alignment errors according to degrees of severity. This step is independent of steps 410-447 and 460-470 and could be placed anywhere among these steps or, if the computer architecture allows, be performed concurrently with these steps. However, the overall process will generally be more efficient if this step is performed after the tests in steps 420, 437, and 447 are performed.

Figure 7:
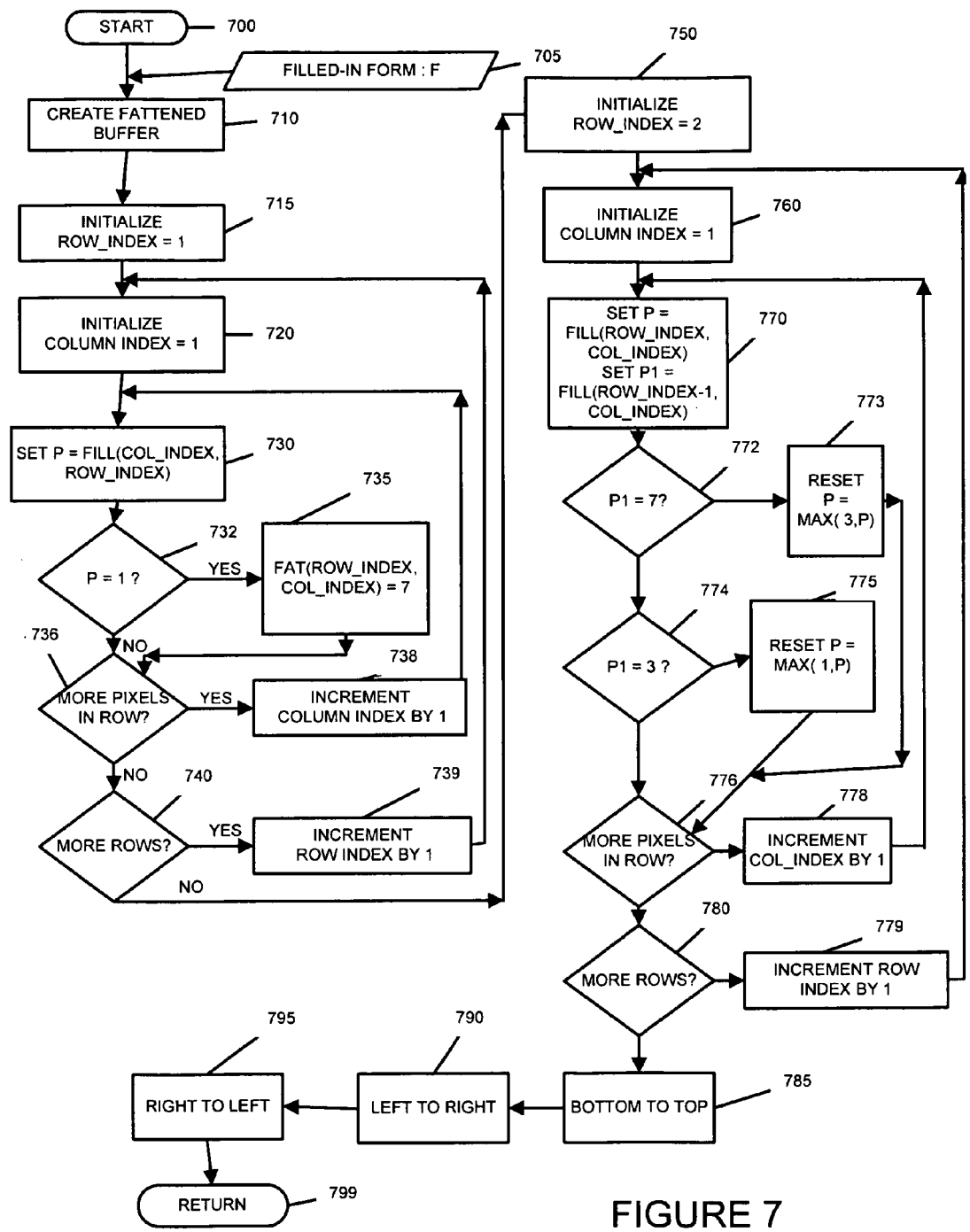
FIG. 7 depicts the method of creating the "fattened" version of the filled-in form in which the user annotations are surrounded by "halos".

Step 450 is depicted in FIG. 7. The method starts in step 700. At step 705 the filled-in form, called F, is introduced into the workflow. In step 710 a buffer, called FAT, is created for the purpose of holding the virtual form that is to be constructed. All pixels in the buffer are initialized to a value of 0. In steps 715-740 this buffer is modified to hold a copy of the filled-in form in which all foreground pixels have the value 7. Steps 715, 720, 736, 738, 739, and 740 are related to the method of accessing pixels from the filled-in form in so-called "scan line order". In step 730 the value of a pixel location is obtained. Its value is tested in step 732. If the value is 1, then the value of the corresponding pixel on the fattened form is set to 7 in step 735. After this the process proceeds to step 736 where the pixel access process continues.

After all pixels have been processed in steps 715-739, the values of pixels in the FAT are modified in two ways in steps 750-795. First, background pixels that border a foreground pixel above, below, to the right, or to the left, are changed from the value of 0 to the value of 3. Then, background pixels that border a pixel whose value is 3 above, below, to the right, or to the left are changed to have value 1. This is accomplished in four passes: from the top of the image to the bottom (steps 760-780), from the bottom to the top (step 785), from left to right (step 790), and from right to left (step 795).

Steps 750-780 depict an exemplary method of carrying out the modification method from the top of the fattened form to its bottom. In step 750, the row index is initialized to 2 (the second row). By means of steps 760, 776, 778, 778, 780, and 779 pixel locations on the fattened form are obtained in scan line order as in creating the fattened form. In step 770 the variable P is set equal to the pixel value of a pixel location and the variable P1 is set equal to the pixel value of the pixel location immediately above. In steps 772 and 773, if P1 is equal to 7, then the value of P is reset to MAX(P,3). In steps 774 and 775, if P1 is equal to 3, then the value of P is reset to the value of MAX(1,P). One effect of this step is to change values of background pixels, but not foreground pixels. After the completion of steps 760-780, only pixels below a foreground pixel have had their values changed according to the rules defined above. To complete the required adjustments to all pixels, it is necessary to implement steps 785-795. In step 785 the control structure of steps 750-780 is adapted to revise the values of all pixels starting at the row one from the bottom (row with index HF-1) and ending at the first row. The art of making this adaptation is well understood in the art of digital computer programming. Similarly, in steps 790 and 795 the control structure of steps 750-780 is adapted to revise the values of all pixels from left to right (step 790) and them from right to left (step 795). In step 799 control is passed to the main process and the fattened form is available for further processing. The details of the adaptations are well understood in the art of digital computer programming.

The above is not the only approach to accomplishing the goal of the completing the buffer FAT. For example, one can treat pixels one at a time and appropriately modify the four neighboring pixels so that the final result is as proclaimed.

In step 460, the process uses the horizontal and vertical extent parameters calculated in steps 435, FY1 and FY0, and 445 (FX1 and FX0) respectively to calculate scaling factors for relating pixels on the blank form to pixels on the filled-in form. The formulas employed are:

$$SCALEX = (FX1 - FX0)/(PBX[4] - PBX[1])$$

$$SCALEY = (FY1 - FY0)/(PBY[4] - PBY[1])$$

In step 465 the reasonableness of the ratio of these factors is tested in a manner similar to the method of step 425. If either SCALEY/SCALEX or SCALEX/SCALEY is greater than ASP_TOL, the ratio is deemed not reasonable and the process ends. Otherwise the process continues to step 170 in which global offset factors are calculated by the rules:

$$XOFFSET = FX0 - PBX[1] * SCALEX,$$

and $$YOFFSET = FY0 - PBY[1] * SCALEY.$$

At this point in the process the alignment function gives the following correspondence between pixel locations on the blank screen (I,J) and pixel locations on the filled-in screen (X,Y):

$$X = SCALEX * I + XOFFSET$$

and $$Y = SCALEY * J + YOFFSET.$$

Because of artifacts arising in the processing of the filled-in form, this correspondence will often not be very good. For example, there could be foreground locations (I,J) on the blank form whose corresponding locations on the filled-in form (X,Y) are background locations. Too many such occurrences might cause one to conclude that the blank form is not a good match for the filled-in form. However, by allowing local corrections to the offset factor, one could hope to obtain a better alignment. By local is meant corrections whose validity is restricted to a small set of pixels on the blank form. A convenient and well-understood method for automatically creating such sets of pixels is to partition the blank form into non-overlapping rectangular blocks with sides parallel to the sides of the form such that the configuration of blocks forms a rectangular array.

Steps 480 and 485 have the purpose of constructing local corrections to the global offsets, XOFFSET and YOFFSET. For a given block of pixels on the blank form, the local corrections will be numbers TX and TY such that the transformation $$X=\text{SCALE}X*I+\text{XOFFSET}+TX$$

and $$Y=\text{SCALE}Y*J+\text{YOFFSET}+TY$$

yield pixel values on the fattened filled-in form, FAT(X,Y), that do not deviate from the corresponding pixel values on the blank form 7*B(I,J). The factor of 7 has the result of giving all foreground pixels on the blank form a value of 7, which makes them compatible with the foreground pixels on the fattened screen, and all background values a value of 0. That is, the method of 480-485 attempts to identify numbers TX and TY such that according to some reasonable measure of distance the accumulated over the given block sum of the differences

|B(I,J)−F(X,Y)| is not too large.

Figure 8:
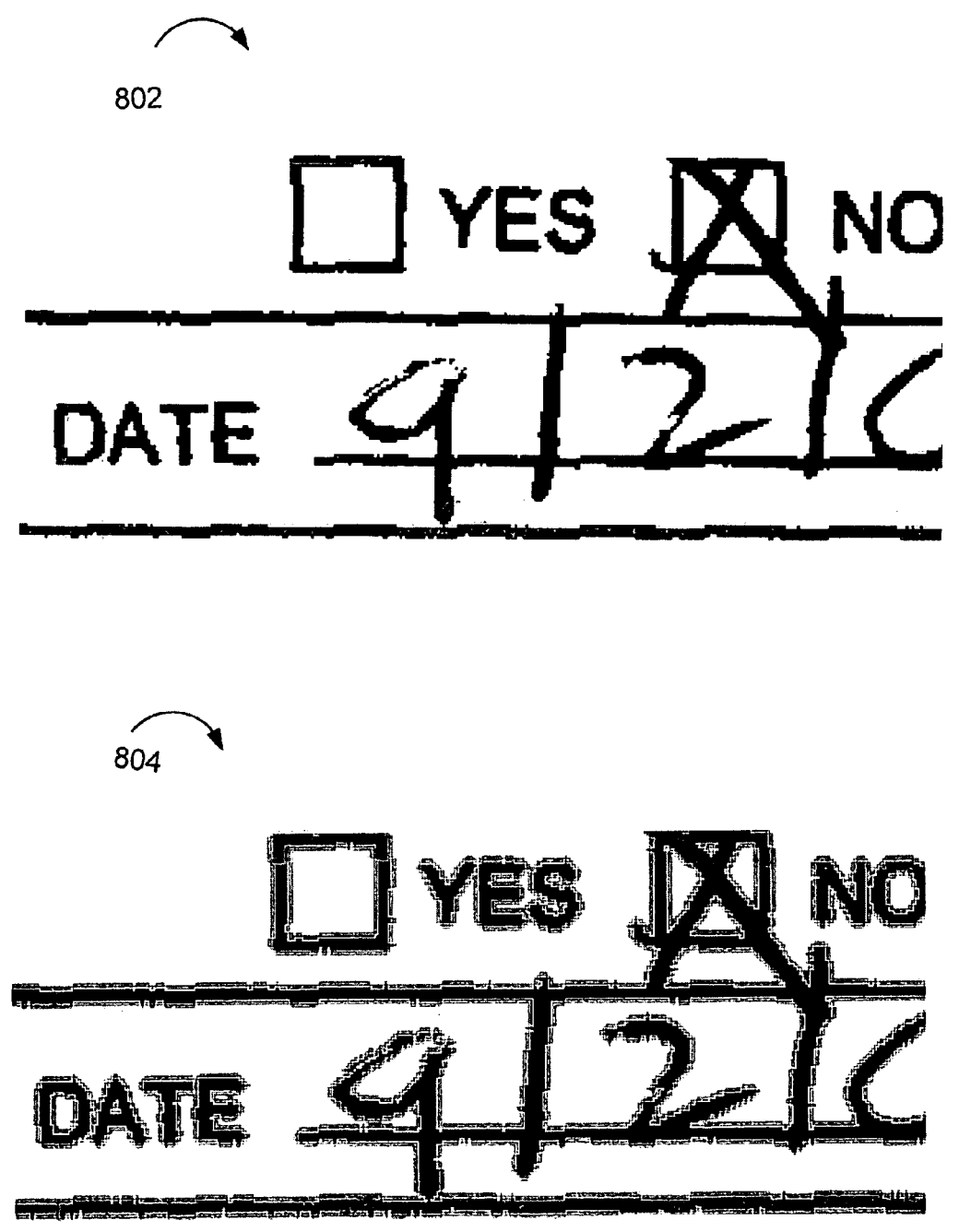

FIG. 8 illustrates an example of a form prior to fattening and after fattening. The unfattened form 802 is shown at the top of FIG. 8. The fattened form 804 is shown in the bottom of FIG. 8. Note that additional foreground pixels have been added to "fatten" the form in the areas where foreground pixels were already located.

Figure 9:
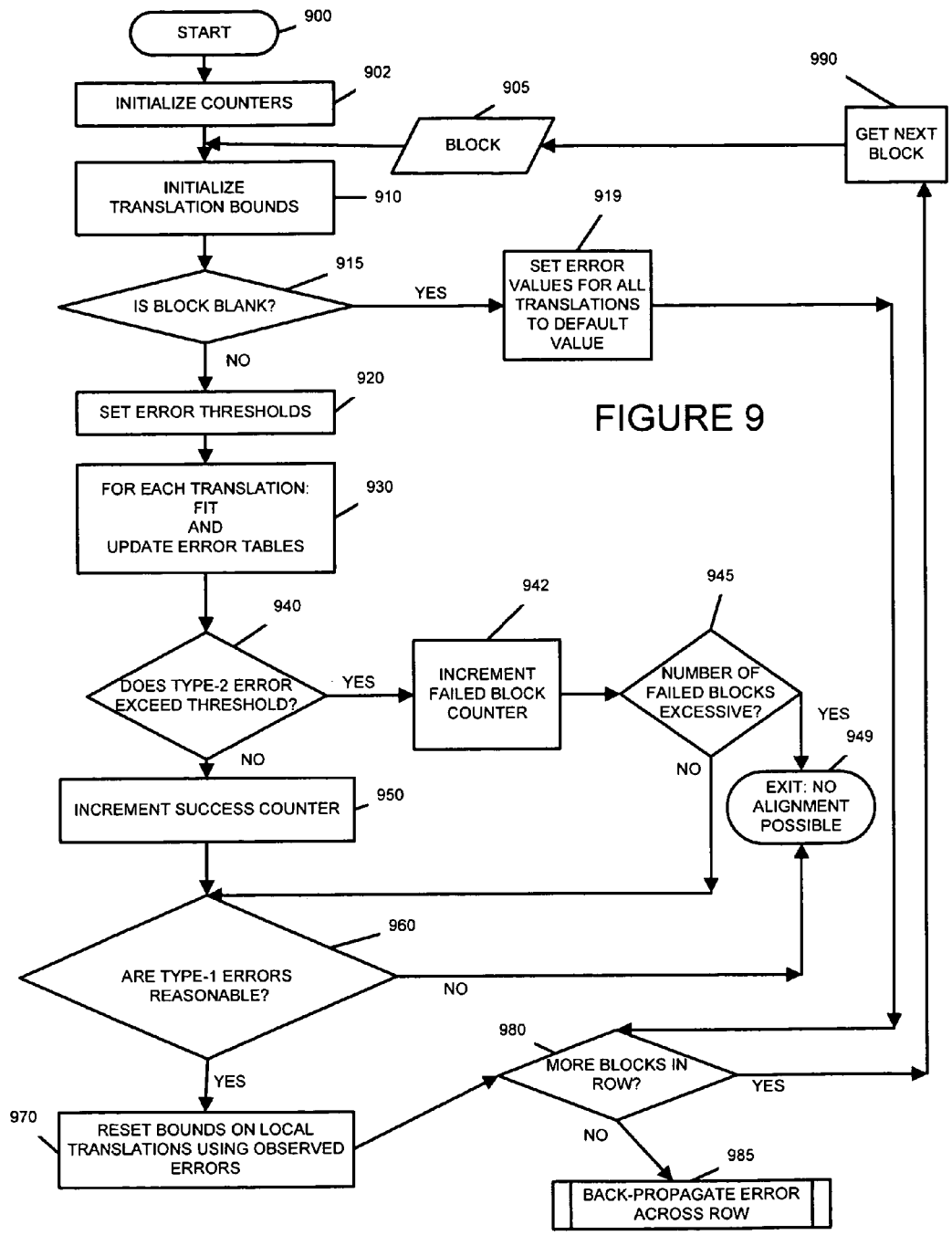
FIG. 9 depicts the method of determining an optimal set of local translation factors.

FIG. 9 illustrates the first step of the method of step 480. The method starts in step 900. In step 902 two counters, named FAILED and SUCCESS, are each initialized to 0. FAILED counts the number of blocks whose TYPE-2 error exceeds a certain threshold and SUCCESS counts the number of blocks whose TYPE-2 error does not exceed the same threshold. A block of the filled-in form is introduced at step 905. In step 910 the set of all allowed values of TX and TY, the offset corrections, is restricted. The values of TX and TY are initially constrained to lie in a range -NBHD_RAD≦TX, TY≦NBHD_RAD, where in an exemplary embodiment of the invention the factor NBHD_RAD is set equal to 16. As the method of step 480 continues, TX and TY are further constrained to be not too much different than the translation corrections of near by blocks. More precisely, if TXMIN is the current value of the smallest allowed value of TX then TXMIN is revised to TXMIN=MINIMUM(TXMIN,TXMIN_UP+FLEX,
    TXMIN_DOWN+FLEX, TXMIN_LEFT+FLEX,
    TXMIN_RIGHT+FLEX)

where TXMIN_UP is the current value of the minimal horizontal translation for the block above, TXMIN_DOWN refers to the current value for the block below, TX_MIN_LEFT refers to the current value for block to the left, TX_MIN_RIGHT refers to the current value for block to the right, and FLEX is the flexibility constant introduced in step 401. In an exemplary embodiment FLEX is taken equal to 1.

Similarly, TXMAX is initialized at each step by the rule

TXMAX=MAXIMUM(TXMAX,TXMAX_UP_FLEX,
    TXMAX_DOWN-FLEX,TXMAX_LEFT-
    FLEX,TXMAX_RIGHT-FLEX).

Step 915 quickly dispatches blocks on the blank form that have no foreground pixels. If all pixels in the block are background pixels, then in step 919 the error made with each translation in the range TXMIN to TXMAX and TYMIN to TYMAX is set to a default value. In an exemplary embodiment this value is taken to be 1. Then, the method proceeds to step 980. And then to either step 990 where the next block is obtained for processing or step 985 the method of which is described in FIG. 11 and steps 1100 through 1160.

If the block is not blank, the method continues at step 920 where TYPE-1 and TYPE-2 error thresholds are set. If the thresholds depend on the number of pixels in the block, they should be reset for each block. In one exemplary embodiment the TYPE-2 error threshold is set to one one-hundredth of the number of pixels in the block and the TYPE-1 error threshold is set to the number of pixels in the block times 6.

Figure 10:
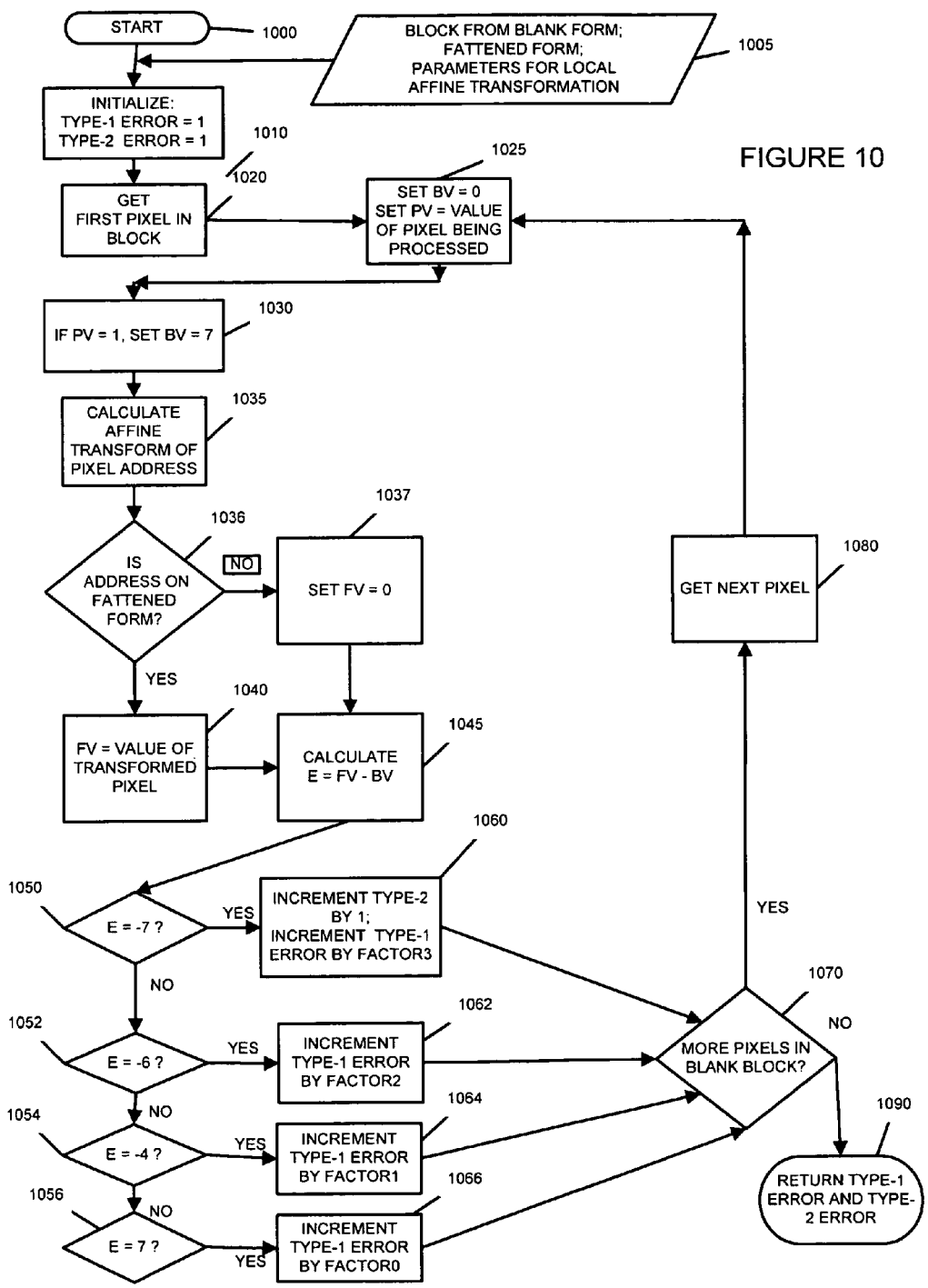
FIG. 10 depicts the method of calculating the distance between a block on the blank form and a block on the filled-in form.

In step 930, each translation in the range [TXMIN,TXMAX] and [TYMIN,TYMAX] is tested in the formula $$X=\text{SCALE}X*I+\text{XOFFSET}+TX$$

and $$Y=\text{SCALE}Y*J+\text{YOFFSET}+TY$$

and the signed error B(I,J)−F(X,Y) is calculated for each pixel location (I,J) in the blank block. The signed error is then converted into a weight which is contributed to an accumulated sum of errors of both TYPE-1 and TYPE-2. The method of calculating is illustrated in FIG. 10 and described in steps 1000 through 1090.

After step 930 the method compares the TYPE-2 error made on this block with the TYPE-2 error threshold in step 940. If the error exceeds the threshold, the counter FAILED is incremented by 1 in step 942, and in step 945 the value of FAILED is compared to the value of SUCCESS. If too many blocks have excessive TYPE-2 errors, then the method decides that no alignment is possible and the method proceeds to step 949 where the process is halted. In an exemplary embodiment of the invention a value of FAILED larger than (5+(SUCCESS)/10), is sufficient for the method to proceed to step 949. Roughly this means the process terminates if more than 10% of the blocks processed to this point have failed to be good TYPE-2 matches. That is if more than 10% of the blocks processed to this point have a considerable number of background pixels where they should have foreground pixels.

If the TYPE-2 error does not exceed the TYPE-2 error threshold, then the counter SUCCESS is incremented by 1 in step 950 and the method proceeds to step 960 in which the quality of the TYPE-1 errors given by the allowed translations is considered. In an exemplary embodiment of the invention, if no translation gives a TYPE-1 error less than the TYPE-1 error threshold, then the method proceeds to step 949 and the process is terminated.

In step 970 the upper and lower bounds on allowed translations for this block are further revised to take into account the TYPE-1 errors given by the translations. For example, in one embodiment of the invention, TYMIN is reset to be the minimum over all values of TY considered that have given an error that is less than the TYPE-1 error threshold. TYMAX, TXMIN, and TXMAX are revised similarly in this embodiment. After step 970 the method proceed to step 980 and then to either step 990 or step 985.

After all blocks in a row are processed from left to right, the row is reprocessed in right to left order. The reprocessing in this step involves only shrinking the range of allowed translations so that the minimal and maximal translation factors differ from those of the block to the right by at most 1. When all rows are processed, the blocks are processed one more time from bottom to top. In this round of processing the allowed range of translations is again reduced by requiring the minimal and maximal translations to differ from those of the block below by at most 1. Also, in this round, a preliminary designation of an optimal translation is made for each block.

FIG. 10 illustrates the method of comparing one block on the blank form with its counterpart on the filled-in form under the local affine transformation $$X=SCALEX*I+XOFFSET+TX$$

and $$Y=SCALEY*J+YOFFSET+TY,$$

where (I,J) is a pixel location in the given block and TX and TY are the local translations under consideration. The method starts in step 1000, and the necessary parameters and data enter the process at step 1005. These include a block from the fattened form, the filled-in form, and the parameters SCALEX, SCALEY, XOFFSET, YOFFSET, TX, and TY.

In step 1010 the TYPE-1_ERROR and TYPE-2_ERROR counters are initialized to 1. In step 1020 the value, PV; and location of the first pixel in the block enters the process. The order in which the pixels are processed does not affect the outcome of the process. In an exemplary embodiment, pixels are ordered in scan line order. In step 1025 the variable BV is initialized to the value 0, the variable PV is set to the value of the pixel being processed, the location of the pixel being processed is denoted by (I,J). The variable BV will to hold the value of a pixel location on the blank screen. In step 1030 if the value of PV is 1, BV is redefined to be 7.

In step 1035, the transformation under consideration is applied to the pixel location. Step 1036 checks if the result gives a valid coordinate on the fattened form. If not, then the variable FV is set to the value 0 in step 1037. If it gives a valid address on the fattened form, then in step 1040 FV is set to the value of the corresponding location on the filled-in screen and errors are calculated in step 1045 and recorded according the method of steps 1050, 1052, 1054, 1056, 1060, 1062, 1064, 1066. In an exemplary embodiment of the invention the increments to the error counters, given in steps 1060-1066 are FACTOR3=3*WIGHT, FACTOR2=2*WEIGHT, FACTOR1=WEIGHT, and FACTOR0=3 where WEIGHT is a constant that entered the process in step 401. In an exemplary embodiment the value of WEIGHT is set to 6. Step 1070 checks if there are more pixels to be processed in the block. If there are, a new pixel is obtained in step 1080. Otherwise, step 1090 returns the values of the errors to the main process. It should be noted that according to the method of steps 1060, 1062, 1064, and 1066 the quantity returned as TYPE-1 ERROR accounts for all errors, weighting each type of error according to a measure of perceived severity. This is the error that is recorded in the error tables of step 930. Subsequent mentions of translation error refer to this error.

Figure 11:
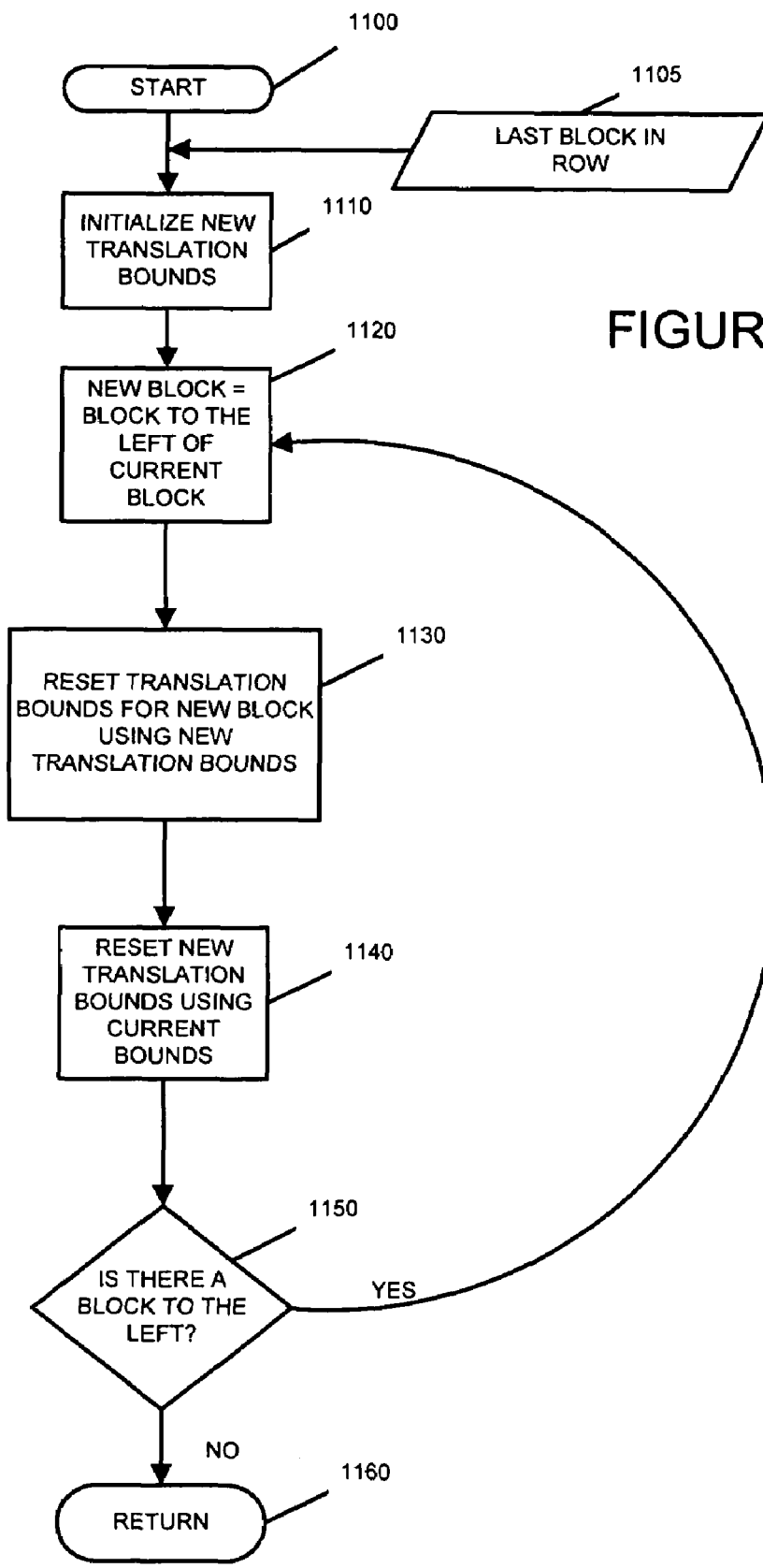
FIG. 11 depicts the method of back propagating the translation bounds back across one row.
Figure 12:
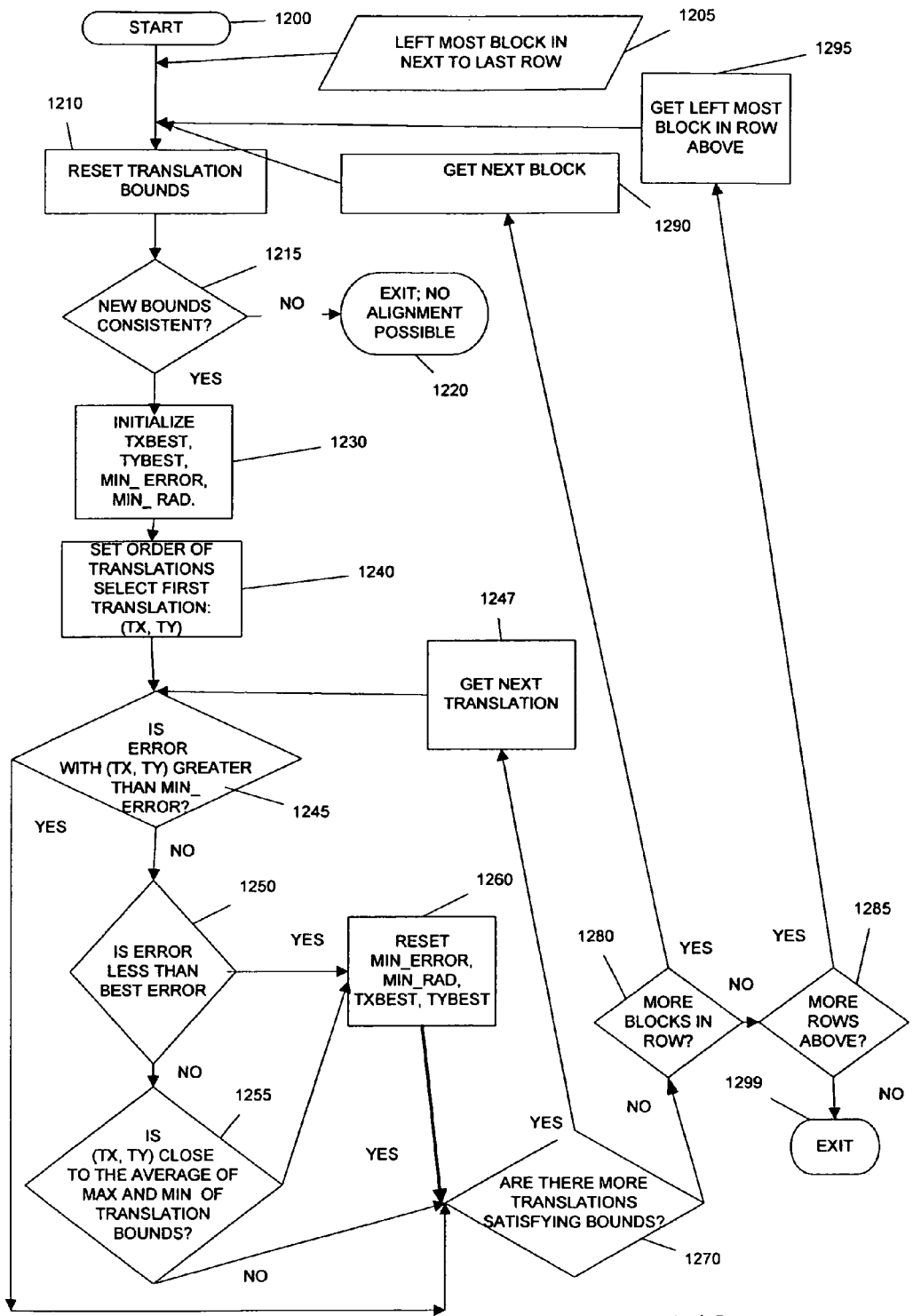
FIG. 12 depicts the method of propagating the translation bounds up the columns of the blank form.

FIGS. 11 and 12 illustrate the second and third steps of method of step 480. After all blocks in a row have been processed from left to right, the row is reprocessed in right to left order. The reprocessing in this step involves revising the range of allowed translations so that the maximal translation factor is no greater than the maximal translation factor of the block to the right plus the quantity FLEX. This process is illustrated in FIG. 11. The process starts at step 1100. In step 1105 the last (right most) block in the row is introduced into the process. In step 1110, the variables NEWTXMAX, NEWTXMIN, NEWTYMAX, and NEWTYMIN are initialized in terms of the existing bounds on the translations of the rightmost block. The initializations are:

NEWTYMIN=TYMIN

NEWTYMAX=TYMAX

NEWTXMIN=TXMIN

NEWTXMAX=TXMAX.

In step 1120 the block to the left of the last block is introduced into the process. In step, its translation bounds, denoted by TXMAX, TXMIN, TYMAX, and TYMIN, are revised as follows:

$TYMIN=MAX(TYMIN,NEWTYMIN-FLEX)$ $TYMAX=MIN(TYMAX,NEWTYMAX+FLEX)$ $TXMIN=MAX(TXMIN,NEWTXMIN-FLEX)$ $TXMAX=MIN(TXMAX,NEWTXMAX+FLEX).$

As noted previously, one embodiment utilizes the value FLEX=1. After this, the variables NEWTYWIN, NEWTYMAX, NEWTXMIN, and NEWTXMAX are revised in step 1140 in terms of the current block as follows:

NEWTYMIN=TYMIN

NEWTYMAX=TYMAX

NEWTXMIN=TXMIN

NEWTXMAX=TXMAX.

This process continues until there are no blocks remaining in the row as steps 1150 indicates. In step 1160 control returns to the main process.

After all rows have been processed, the blocks are processed one more time from bottom to top. In this round of processing the allowed range of translations is again revised by requiring the minimal and maximal translations to differ from those of the block below at most by the quantity FLEX. Also, in this round, a preliminary designation of an optimal translation is made for each block. This process is illustrated in FIG. 12. The process starts in step 1200. In step 1205 the left most block in the last row is introduced into the process. In step 1210 the bounds on the translation of the block above this block are reset in a manner analogous to the translation bound resetting methods depicted in FIGS. 11 and 9. In the current case the translations are reset by the rules

NEW$TYMIN=MAX(TYMIN,TYMIN\_DOWN-$
   FLEX)

NEW$TYMAX=MIN(TYMAX,TYMAX\_DOWN+$
   FLEX)

NEW$TXMIN=MAX(TXMIN,TXMIN\_DOWN-$
   FLEX)

NEW$TXMAX=MIN(TXMAX,TXMAX\_DOWN+$
   FLEX).

In step 1215 a consistency check is performed on these bounds. If either NEWTYMIN>NEWTYMAX or NEWTXMIN>NEWTYMAX, then the process is halted as indicated in step 1220.

Steps 1230 to 1270 describe how an initial determination of best translation for the current block is made. In steps 1230 certain variables are initialized: the best translations are initialized as TXBEST=TXMIN and TYBEST=TYMIN; the minimal observed error is initialized as MIN_ERROR=the error that TXMIN and TYMIN give. This had been recorded in a table in step 930 and is the TYPE-1 ERROR return by step 1090. Finally, the variable MIN_RAD is initialized by

MIN_RAD=|NEW*TY*MIN−NEW*TY*MAX|+
|NEW*TX*MIN−NEW*TX*MAX|.

This variable quantifies the extent of the set of allowed translations. If it were 0, then there would be only one allowed translation for the block being processed. It is typically not zero.

Steps 1240 through 1260 concern the updating of the variables defined in steps
1230 by considering the error given each of the allowed translations. In step 1240 and the translations allowed for processing the current block are ordered—the particular order is not material to the process—and an initial translation pair (TX,TY) is selected. In step 1245 the error, ERROR, made with this translation is read from the error table earlier recorded in step 930 and compared with MIN_ERROR.

If ERROR is greater than MIN_ERROR, then the process proceeds to step 1270 to check of there are more translations to be tested. If there are, the process continues in step 1247 to get the next translation and process it starting with step 1245. If there are no more translations to be considered, the process checks if there are more blocks in the current row in step 1280 and proceeds either to step 1290 and processes the next block or to step 1285 where it checks if there are more rows to be processed. If there are more rows to be processed, the process continues in step 1290 to get the left most block in the next row. If there are no more blocks to be processed, the process proceeds to step 485.

If in step 1245 ERROR is less than or equal to MIN_ERR, the process continues to step 1250. If in step 1250 ERROR is determined to be strictly less than MIN_ERR, then in step 1260 MIN_ERROR is reset to equal ERROR; TYBEST is set to TY and TXBEST is set to TX; and MIN_RAD is revised as follows:

MIN_RAD=|2**TY*−NEW*TY*MIN−NEW*TY*MAX|+
|2**TX*−NEW*TX*MIN−NEW*TX*MAX|.

MIN_RAD is basically the distance of the best current value of the best translation from the average of the range of all allowed translations.

If ERROR=MIN_ERR, then in step 1255 the quantity |2*TY−NEWTYMIN−NEWTYMAX|+|2*TX−NEWTXMIN−NEWTXMAX| is calculated. If this is strictly less than MIN_RAD, then the process continues to step 1260 and the values TXBEST, TYBEST, MIN_RAD, and MIN_ERR are reset as described previously. In this case the resetting of MIN_ERR is redundant since ERROR is not strictly less than MIN_ERR. The point of this step is to break ties between translations that give the same value of ERROR. Translations whose proximity to the midpoint of the range of all translations are deemed better for the purposes of later processing. The embodiment described here utilizes what is known as the L-1 metric to compare the translation (TX, TY) to the midpoint of the range of all allowed translations ((NEWTXMIN+NEWTXMAX)/2, (NEWTYMIN−NEWTYMAX)/2). It is well known in the art that there are many other metrics that one can employ here.

After step 1260 the process proceeds to step 1270 to check of there are more translations to be tested and proceeds from there as was described previously.

The final step of the method of step 480 is to apply steps 1230 through 1299 to the blocks in the last row of the blank form.

At this stage of the process, the following information is known for each block on the blank form: upper and lower bounds on the allowed range of translations, TXMIN, TYMIN, TXMAX, TYMAX; the error made by each translation; and an initial value for the best translation pair (TXBEST,TYBEST). In fact, according to the criterion established in step 485, these are the best values in that they minimize the error and are as close to the mid-point of the range of translations as it is possible to be. In step 485, the criterion for best translation is changed to include not only the error, but also the variation of the translation from the best translations associated with the four nearest neighboring blocks: the blocks above, below, to the left, and to the right. By obvious extension of this notion of neighboring block, blocks in the corners have only two neighbors, and non-corner blocks on the edge of the blank form have three neighbors.

The method of step 485 is one of iteratively selecting a translation for a given block that minimizes a quantity defined as the sum of one-half the error that the given translation gives with the sum of the squares of the L-2 distances between the given translation and the best translations associated with the neighboring blocks. In the case of a block having four neighbors, (TX,TY) is a translation for the block under consideration and the error it gives, ERROR, is the TYPE_1 ERROR returned in step 1090. If the best translations for the neighboring blocks are (TX1,TY1), (TX2,TY2), (TX3,TY3), (TX4,TY4), then step 485 attempts to minimize a quantity of the form $Q(TX,TY)=W1*ERROR+W2*((TX-TX1)*(TX-TX1)+$
$(TY-TY1)*(TY-TY1)+(TX-TX2)*(TX-TX2)+$
$(TY-TY2)*(TY-TY2)+(TX-TX3)*(TX-TX3)+$
$(TY-TY3)*(TY-TY3)+(TX-TX4)*(TX-TX4)+$
$(TY-TY4)*(TY-TY4)),$ where W1 and W2 are weights. In an exemplary embodiment, W1 is taken to be 0.5 and W2 is taken to be 1.0.

Since a change in the value of the best translation for a particular block will propagate over all blocks and perhaps make a different translation give a smaller value to Q on this block, it is reasonable to minimize Q for each block, the blocks being taken in the order of left to right from top row to bottom row, and then to repeat the process a number of times.

Figure 13:
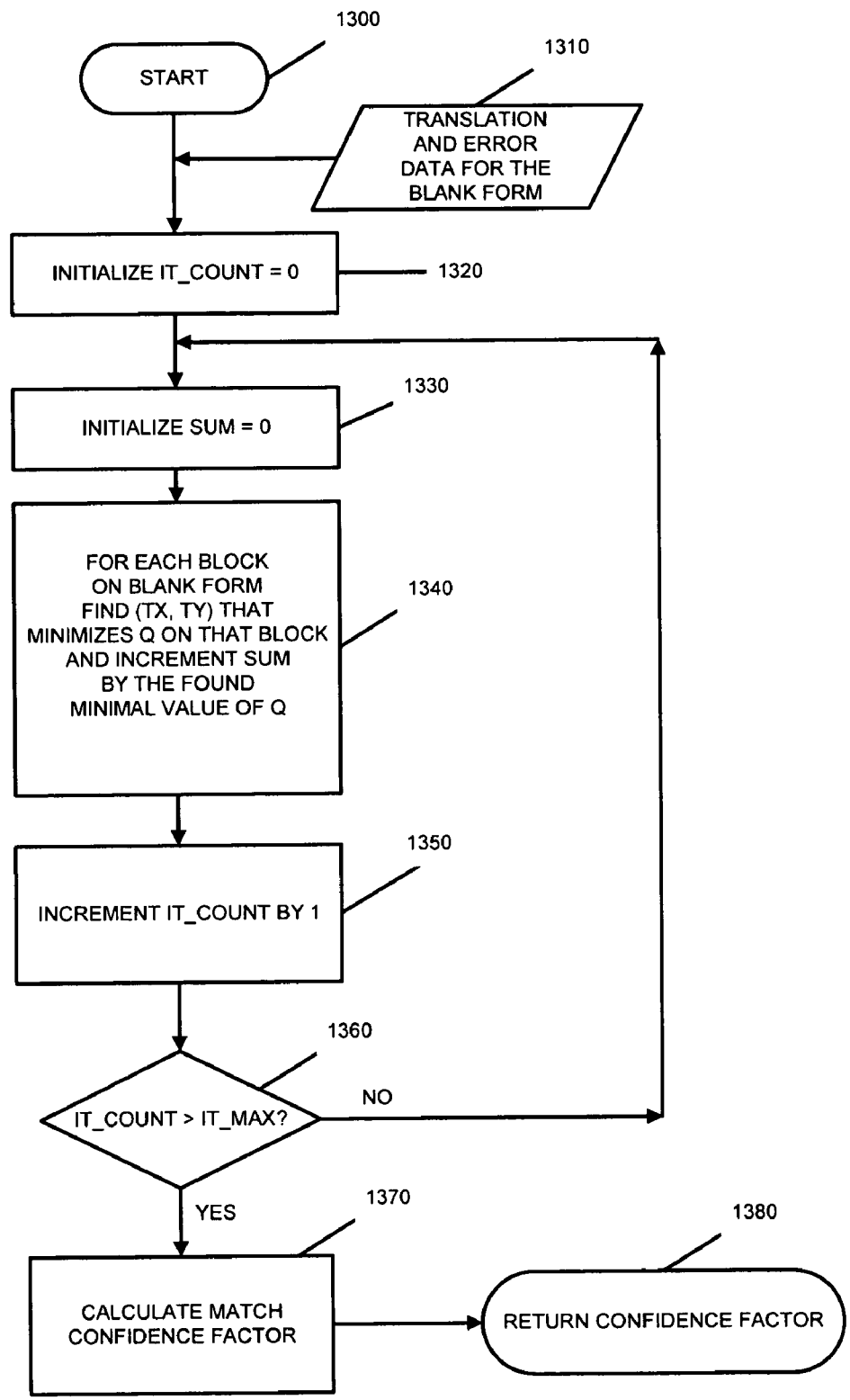
FIG. 13 depicts the method of iteration used to determine the translations that optimize the weighted optimality condition.

FIG. 13 illustrates step 485. The method starts in step 1300. In step 1310 the tables of translation errors and bounds calculated in step 480 are introduced into the method. In step 1320 the iteration counter IT_COUNT is initialized to 0. In step 1330 the variable SUM is initialized to 0. This variable will accumulate the values of Q as the translation data is processed. In step 1340 the best translation pair, (TXBEST, TYBEST), is found by evaluating Q for each allowed translation for the block and comparing values. Also, the value of SUM is incremented by the error given by this translation pair. In this calculation the best translation pairs for the neighboring blocks are unchanged. As mentioned above it is common and natural to process the blocks is a particular order. However, it is not necessary to do so. In step 1350 the iteration counter IT_COUNT is incremented by 1. In step 1360 the value of IT_COUNT is compared to the value of IT_MAX introduced in step 401. If the value of IT_COUNT does not exceed IT_MAX, the process continues at step 1330. Otherwise, a confidence factor is calculated in step 1370 and returned in step 1380. A low confidence factor might suggest halting the process for the reason that an alignment of forms appears unlikely. The confidence number should be a function of the final value of SUM with a range of normalized values, like 0 to 100, a high value signifying high confidence that the forms can be aligned and a low value signifying low confidence that the forms can be aligned. In an exemplary embodiment the following formula is used:

CONFIDENCE=MAX(1,MIN(99,(30−25 log(SUM/(AREA OF BLANK FORM))))).

At this point in the process if it were being run with a "human-in-the-loop", an operator of the invention might decide, based on the value of CONFIDENCE and other unrelated matters, that there is little likelihood for alignment and halt the process. If the invention were being operated without the possibility of human intervention, the quantity CONFIDENCE would be compared to a confidence threshold value and the process would halt if the threshold were not exceeded. This is what occurs in some automated embodiments which do not use human intervention at this point in the processing.

Figure 14:
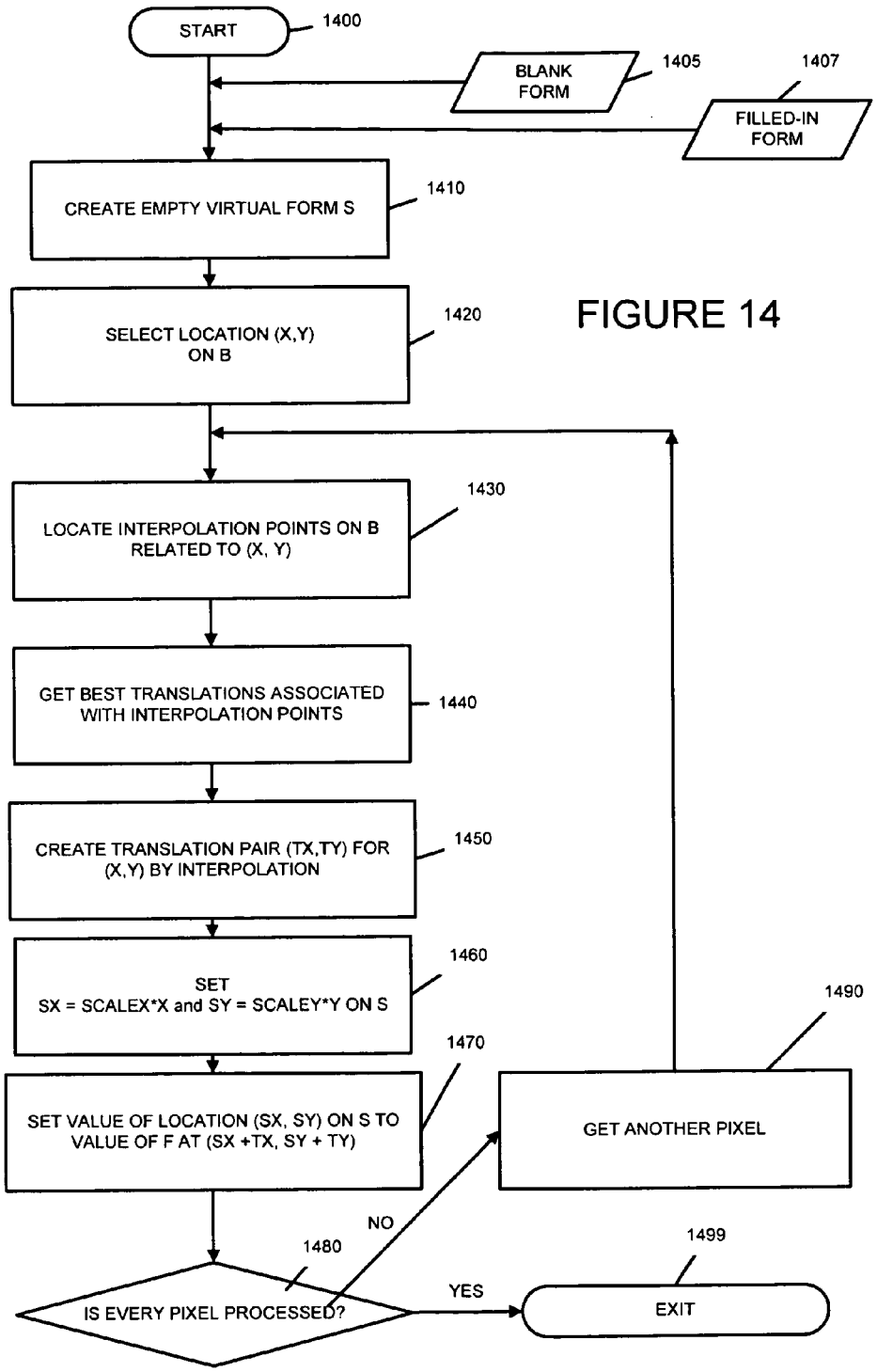
FIG. 14 depicts the method of constructing a virtual form that aligns with the blank form and contains the annotation on the filled-in form.

In step 490 the optimized translations found in step 485 are used to construct, pixel by pixel, a virtual form, S, whose range of pixel locations is identical with those of the blank form and whose pixel values are obtained from the pixel values of the filled-in form through an interpolation process applied to a set of associated best translations. This virtual form has the pixels values of the filled-in form aligned with the pixel locations of the blank form. FIG. 14 provides an overview of this process. The process starts in step 1400 after which the blank form, B, and filled-in form, F, are introduced in steps 1405 and 1407. A blank virtual form is initialized in step 1410, and in step 1420 a pixel location, (X,Y), is selected from it. Typically, one selects pixels in scan line order, but other orderings may be convenient for particular computer or software architectures.

In step 1430 the process selects interpolation points, depending on the location of (X,Y). Typically, the interpolation points are specified in advance In general one has great latitude in selecting interpolation points and interpolation strategies as the area of multivariate interpolation is well developed. (For example, the 1976 survey paper of Schumaker, "Fitting Surfaces to Scattered Data", in *Approximation Theory II*, Lorentz, Chui, and Schumaker, editors, Academic Press, 1976, which is hereby expressly incorporated by reference includes a discussion and over refers to numerous references related to this topic.) One common choice related to the processing of rectangular arrays of data would be the corners of the blocks in a partitioning scheme. In one embodiment of this invention the set interpolation points is defined to be the set of all centers of all of the blocks defined in the partitioning of the blank form. In this case points (X,Y) that lie far enough away from the boundary of the blank form (namely, those that satisfy width of the first column of blocks<2X<width of the last column of blocks and height of the first column of blocks<2Y<height of the last column of blocks) are contained in a smallest rectangle whose corners are the centers of four such blocks. These four centers are the interpolation points in this case. A pixel location (X,Y) that lies near an edge, but not near a corner (that is, a location that fails only one of the two criteria above), is associated with two interpolation points, namely the centers of the two blocks that are closest to (X,Y). A pixel location that lies near a corner (that is, a location that fails both of the criteria) is associated with only one interpolation point, the center of the block in which the pixel location lies.

Associated with each of these interpolation points located in step 1430 is the best translation for the block in which the interpolation point lies. In step 1440, these are selected. For example, in the embodiment discussed previously, the interpolation process is as follows. Given that X lies between $X0$ and $X1$ and Y lies between $Y0$ and $Y1$, where $(X0,Y0)$, $(X1,$ $Y0)$, $(X0,Y1)$, and $(X1,Y1)$ are the centers of the four blocks closest to (X,Y), suppose that the best translation pairs associated with these four blocks are labeled (TX00,TY00), (TX10,TY10), (TX01,TY01), (TX11,TY11), where the second letter indicates the direction of the translation (X for horizontal, Y for vertical) and the indices indicate the location (for example, TX01 is the best horizontal translation for the block whose center is $(X0,Y1)$). In this we assume that the translations incorporate the global offsets as well as the corrections whose selection was the object of previous steps of the invention.

The process constructs, in step 1450, for the pixel location (X,Y), a translation (TX,TY) by interpolating between the best translations associated with (X,Y). There are many methods for multivariate interpolation known in the interpolation and approximation literature. The embodiment described here employs bilinear interpolation in which case the formulas that determined the translations TX and TY for the point (X,Y) are as follows:

Set DENOM=$(X1−X0)(Y1−Y0)$ $TX=((Y1−Y)(X1−X)TX00+(Y1−Y)(X−X0)TX10+(X−X1)(Y−Y0)TX01+(X−X0)(Y−Y0)TX11)$/DENOM $TY=((Y1−Y)(X1−X)TY00+(Y1−Y)(X−X0)TY10+(X−X1)(Y−Y0)TY01+(X−X0)(Y−Y0)TY11)$/DENOM

If the point (X,Y) is near the edge of the blank form, then the formulas are modified to use the translations associated with the blocks closest to (X,Y). Such modifications are both natural and well known in the art. In particular, if (X,Y) is near a corner of the form, then the method uses only the translations associated with the block in which (X,Y) lies. If (X,Y) is near the top or bottom edge of the form, then the best translation associated with (X,Y) will be an average of the translations associated with a block to the left and with a block to the right of (X,Y).

If (TX,TY) denotes the translation pair associated with the pixel location (X,Y) on the blank form, then the point (SX, SY) on the filled-in form is calculated in step 1460 as $SX=X*SCALEX$ $SY=Y*SCALEY.$ In step 1470 The value of the pixel (SX,SY) is defined to be F(SCALEX*X+TX,SCALEY*Y+TY) where F is the filled-in form.

Through steps 1480 and 1490 this method is applied to every pixel location on the blank form. When no pixels remain, the process ends in step 1499.

Embodiments of this invention may utilize well-known techniques in the art of computer programming in order to make the execution be more efficient on particular processors. Examples of such techniques are the use of look-up tables, the use of binary arithmetic and boolean operations at the bit-level, and the simulation of floating point arithmetic through the use of high precision integer arithmetic. Such implementations are to be considered complementary to the art of this invention.

Figure 15:
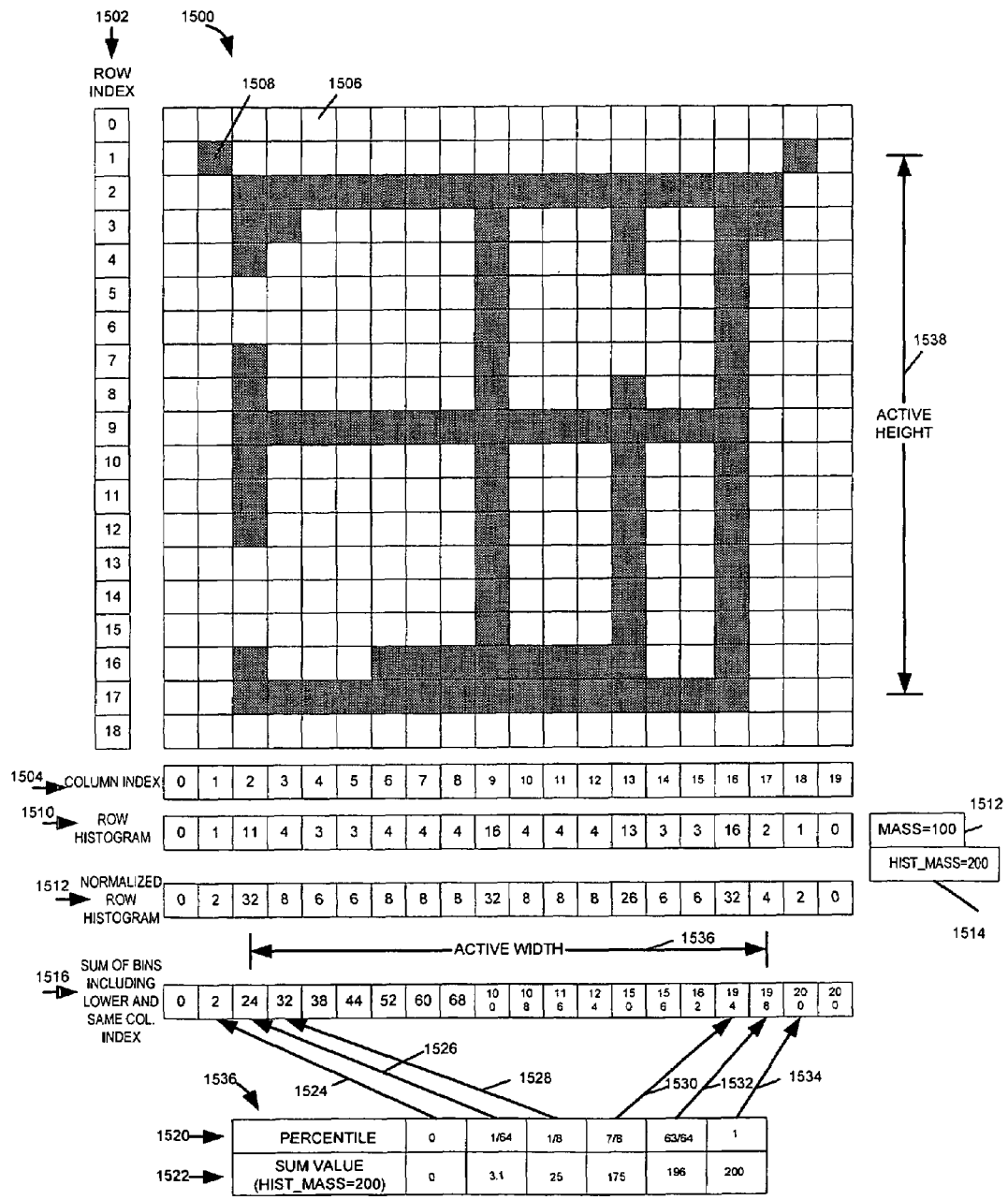
FIG. 15 is a drawing illustrating an exemplary collection of statistical data on an exemplary scanned form, in accordance with the methods of the present invention.

FIG. 15 is a drawing illustrating an exemplary collection of statistical data on an exemplary scanned form, in accordance with the methods of the present invention. The scanned form may be either a blank form or a filled-in form. Region 1500 corresponds to a representation of an area being processed which includes the exemplary form. Region 1500 includes 380 small blocks, each block representing a pixel in a pixel array. The pixel array has row index values 1502 and column index values 1504. The address of a pixel or pixel location is obtained by obtaining the corresponding row index value and the corresponding column index value. The value for each of the pixels representing background color is set to 0; such pixels are represented by no shading as with exemplary pixel 1506. The value for each of the pixels representing foreground color is set to 1; such pixels are represented by shading as with exemplary pixel 1508.

For each column index value 1504 or column coordinate (0, 1, . . . , 19), the values of the pixels in the identified column are summed. This produces a vector represented by row histogram vector 1510. The sum of the values of the row histogram vector 1504 produces a MASS value 1512. In this example the MASS=100 representing a total of 100 foreground pixels in region 1500. In order to facilitate the comparison of histograms of one form with histograms of another form which may have different values for the MASS parameter, a common value HIST_MASS 1514 is used. In this example HIST_MASS 1514 is set to 200. The elements of the row histogram vector 1510 are multiplied by HIST_MASS/MASS, resulting in normalized row histogram vector 1512.

Next a bin sum vector 1514 is obtained, where for each column index value, a bin sum vector value is obtained, where the bin sum vector value equals the sum of the normalized row histogram vector values corresponding to the same or lower index values.

Table 1516 shows an exemplary statistical evaluation table 1516, in accordance with the present invention. Table 1516 includes a set of percentiles 1520 (0 percentile, $\frac{1}{64}$ percentile, $\frac{1}{8}$ percentile, $\frac{7}{8}$ percentile, and $\frac{63}{64}$ percentile, and 1 percentile). Table 1522 also includes corresponding sum values for each percentile based on a HIST_MASS=200. For each of the percentiles (0, $\frac{1}{64}$, $\frac{1}{8}$, $\frac{7}{8}$, $\frac{63}{64}$), a comparison is made between the statistical evaluation table sum value (0, 3.1, 25, 175, 196), to the values of bin sum vector 1514, and the point where the bin sum vector value exceeds the statistical evaluation sum table value is determined and associated with the corresponding percentile. Percentile (0, $\frac{1}{64}$, $\frac{1}{8}$, $\frac{7}{8}$, $\frac{63}{64}$) is associated with column index (1, 2, 3, 16, 17), as indicated by arrows (1524, 1526, 1528, 1530, 1532), respectively. The 1 percentile is associated with the lowest column index where the sum value=200, column index=18, as indicated by arrow 1534.

Next a concept of an active width is introduced. In this example, the active width is defined to be the difference between the column index associated with the $\frac{63}{64}$ percentile and the column index associated with the $\frac{1}{64}$ percentile. Active width 1536 represents a distance of 15 columns.

A similar statistical evaluation of the pixels is performed using rows instead of columns, obtaining a column histogram vector, a normalized column histogram vector, and a column bin sum vector. Statistical evaluation table 1516 can be used to associate row index values with the various percentiles (0, $\frac{1}{64}$, $\frac{1}{8}$, $\frac{7}{8}$, $\frac{63}{64}$, 1). For the row based evaluation, an active height is obtained in place of the active width. In this example, the active height is defined to be the difference between the row index associated with the $\frac{63}{64}$ percentile and the row index associated with the $\frac{1}{64}$ percentile. Active height 1536 represents a distance of 16 rows. A concept of an active aspect ratio is introduced, where the active aspect ratio equals the active width divided by the active height.

Figure 16:
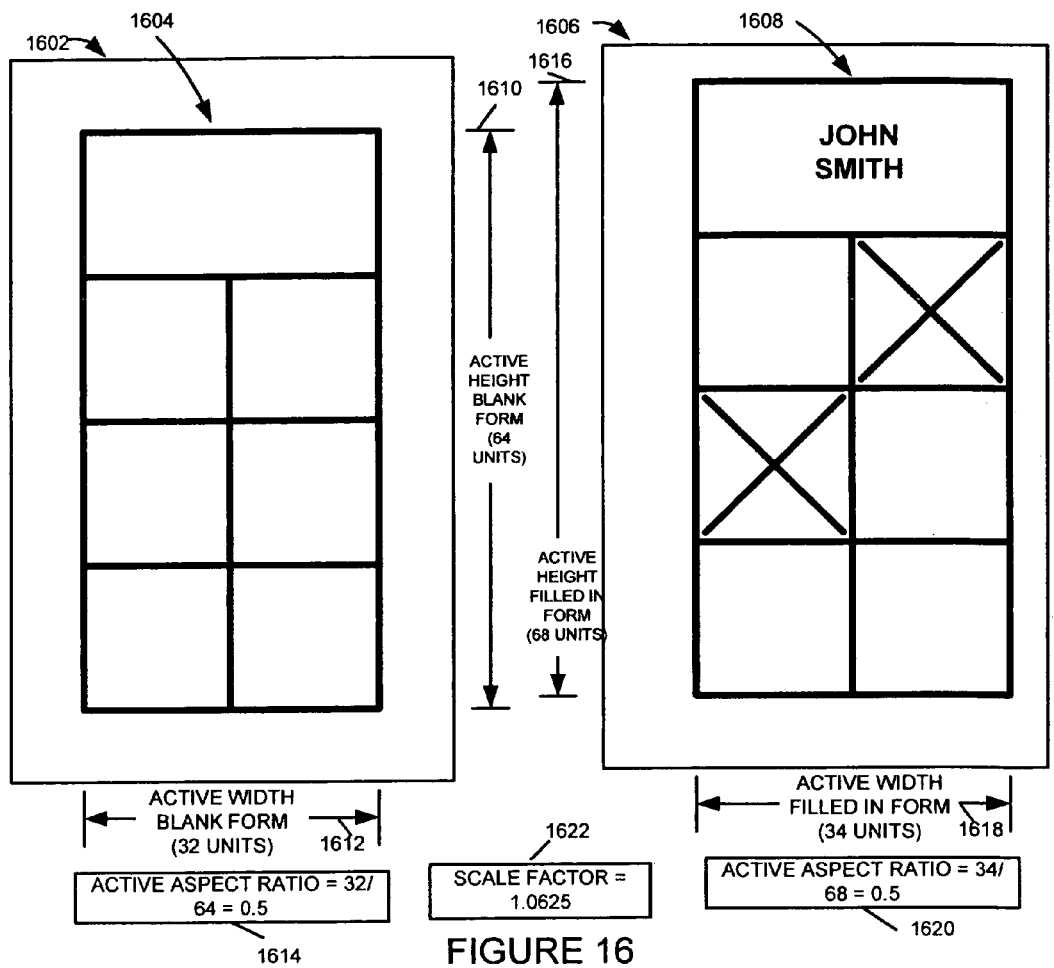
FIG. 16 is an example of a blank form being compared to a filled-in form, in accordance with methods of the present invention.
Figure 17:
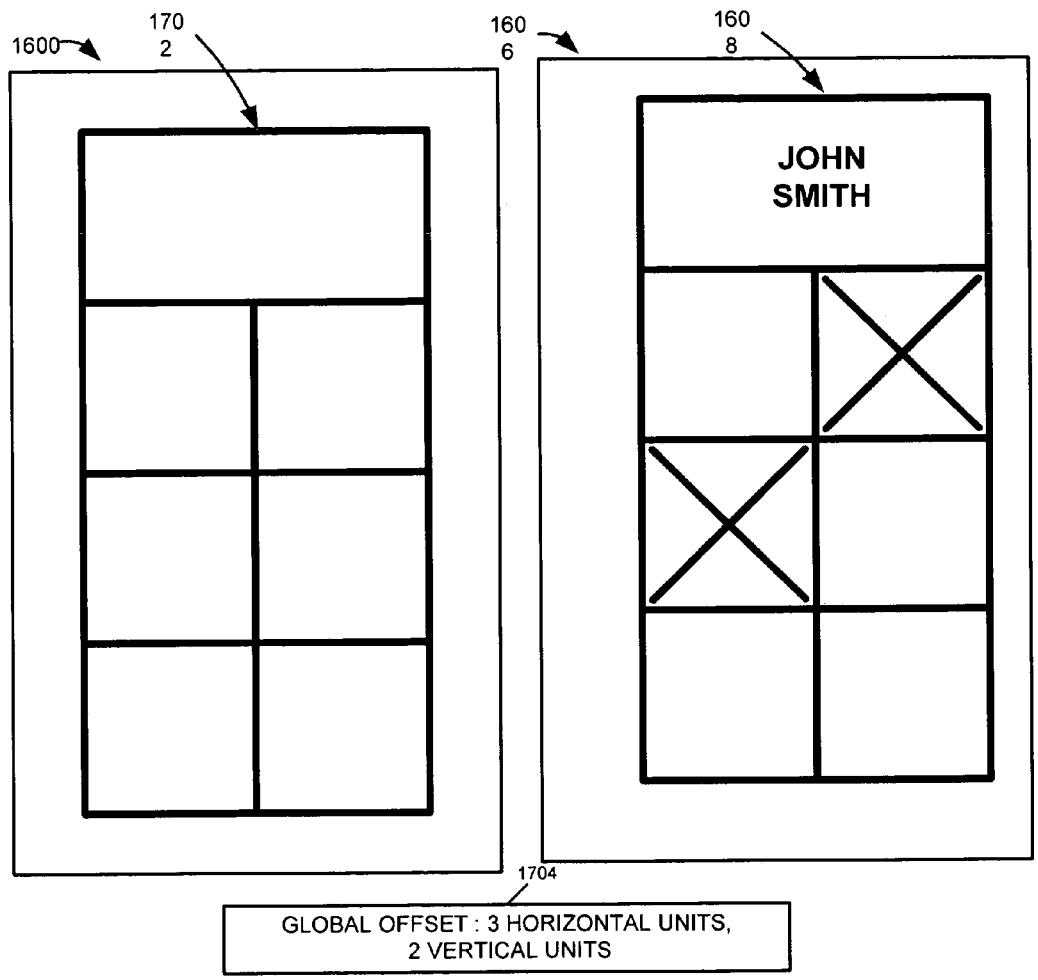
FIG. 17 illustrates the result of a rescaling operation performed on blank form.
Figure 18:
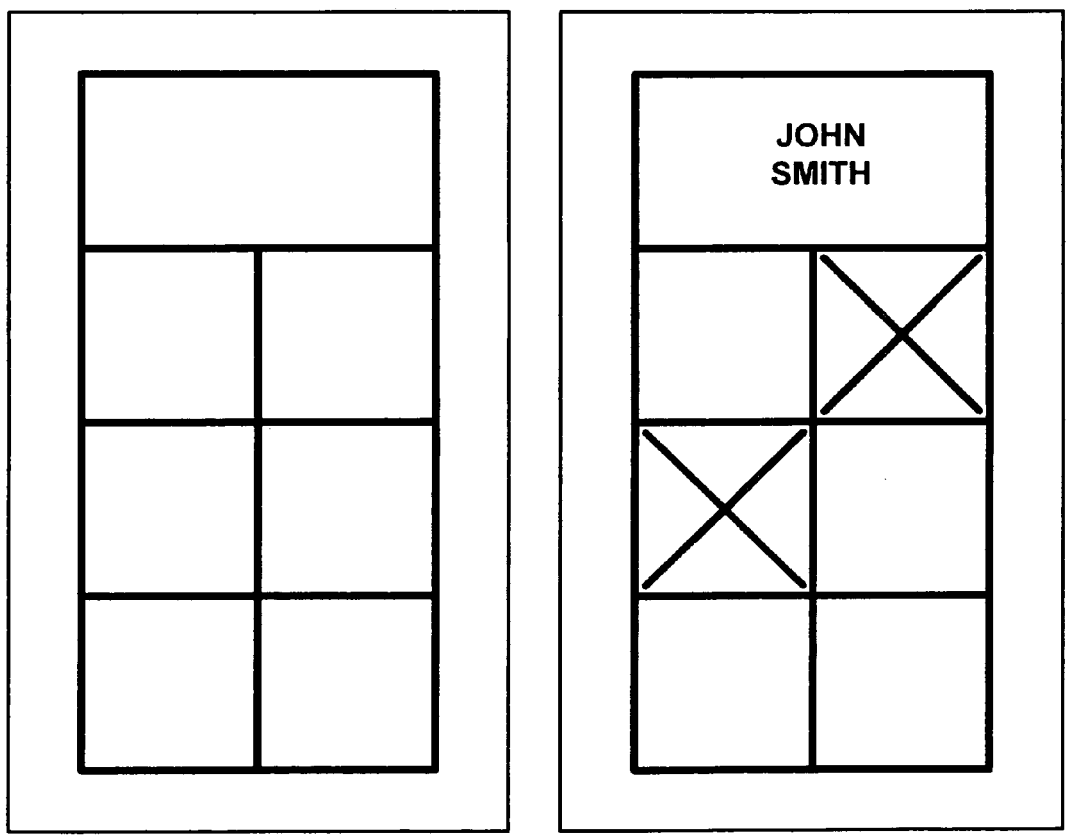
FIG. 18 is a drawing illustrating the effect of removal of the determined offset described in FIG. 17.

FIG. 16 is an example of a blank form being compared to a filled-in form, in accordance with methods of the present invention. Block 1602 represents an exemplary pixel array region including a blank form 1604. Block 1606 represents an exemplary pixel array region including a filled-in form 1608. It may be assumed that statistical analysis techniques as described with respect to FIG. 15 are used to obtain active height and active width for each form. The active height of the blank form 1610 is 64 units, and the active width of the blank form 1612 is 32 units; the active aspect ratio 1614 is $\frac{32}{64}$=0.5. The active height of the filled-in form 1616 is 68 units, and the active width of the blank form 1618 is 34 units; the active aspect ratio 1614 is $\frac{34}{68}$=0.5. Since the active aspect ratio of the blank form 1614 matches the active aspect ratio of the filled-in form 1620 to within a predetermined tolerance, the forms are considered to match at this point in the form comparison process. A scaling factor 1622 is determined that if applies to the blank form will cause the dimensions of the blank form to match the dimensions of the filled-in form. In this case, the exemplary scaling factor 1622 is 1.0625. FIG. 17 illustrates the result of a rescaling operation performed on blank form 1604 resulting in rescaled blank form 1702. It should be noted that although the blank form and the filled-in form now have the same scaling, the filled-in form is still offset in its pixel array region with respect to the blank form's position in its pixel array region. In this example, a global offset 1704 of 3 horizontal units and 2 vertical units exists and is determined in accordance with the methods of the present invention. FIG. 18 is a drawing 1800 illustrating the effect of removal of the determined offset described in FIG. 17. The blank form and the filled-in form now have the same scaling and are each positioned in the same approximate location. Additional refinements are then performed on a lower level. The pixel array region including the blank form may be subdivided into a fixed number of non-overlapping rectangular blocks, each rectangular block including a fixed number of pixels.

Figure 19:
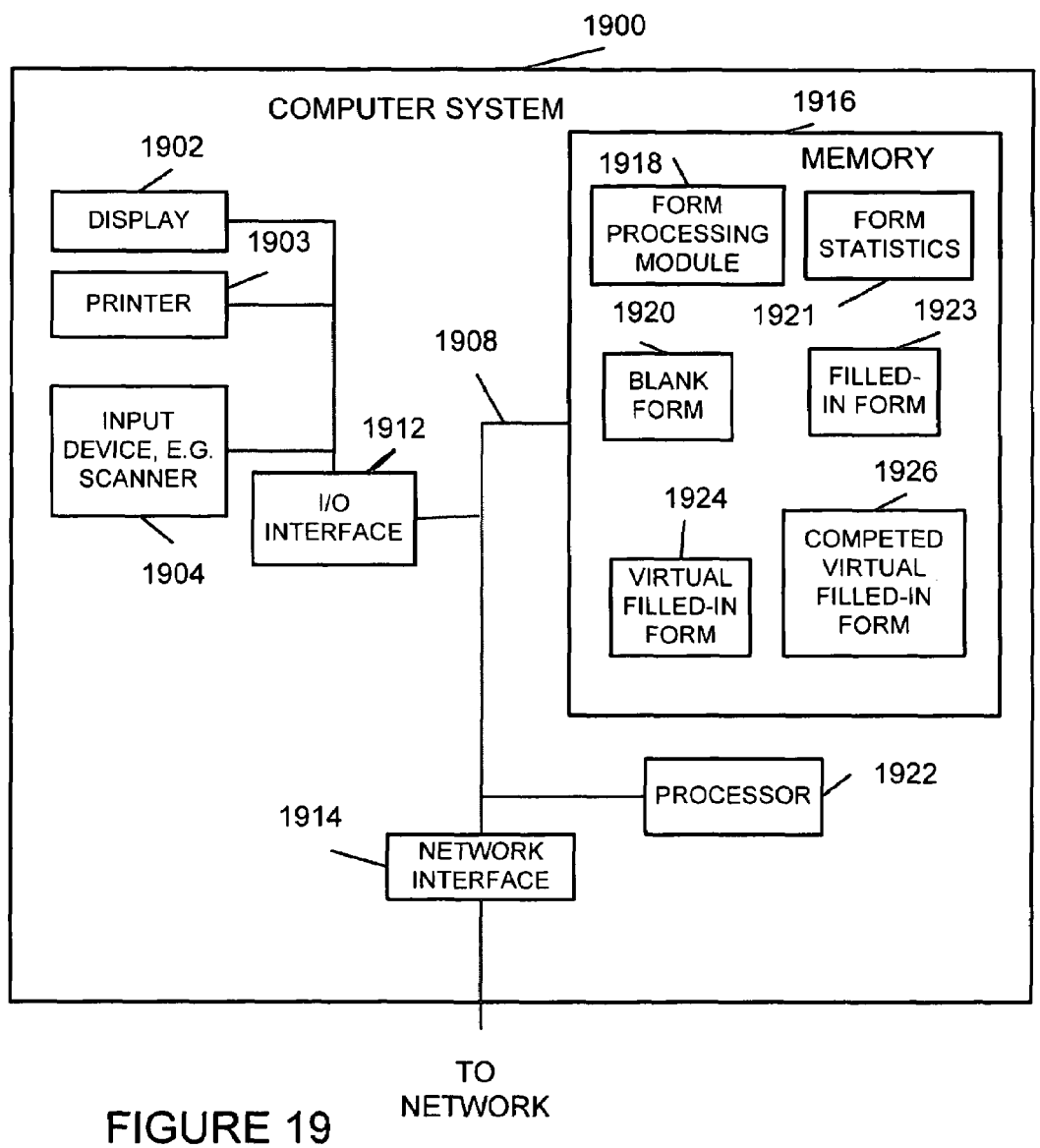
FIG. 19 illustrates a system implemented in accordance with the present invention.

FIG. 19 illustrates an exemplary system, e.g. computer system 1900, for processing image data, e.g., a blank form 1920 and a scanned filled-in form 1923, in accordance with one embodiment of the present invention. The computer system 1900 includes a display device 1902, a printer 1903, an input device 1904, e.g., scanner for scanning paper versions of filled-in forms, memory 1916, a processor 1922, a network interface 1914, and I/O interface 1912. The display device 1902 may be used, e.g., to display completed virtual filled-in forms resulting from processing implemented in accordance with the present invention while the printer 1903 can be used to print such forms. The display 1902, printer 1903 and scanner 1904 are coupled to a bus 1908 by I/O interface 1912. The bus 1908 is also coupled to the memory 1916, processor 1912 and network interface 1914. The network interface 1914 couples the internal components of the system 1900 to an external network, e.g., the Internet, thereby allowing the system 1900 to receive and send image data, e.g., digitize forms and forms generated in accordance with the invention, over a network. The processor 1922 controls operation of the computer system 1900 under direction of software modules and/or routines stored in the memory 1916. Memory 1916 includes form processing module 1918 which includes a software routine, e.g., machine executable instructions, for implementing the above-described image processing methods of the present invention. Individual steps and/or lines of code in form processing module 1918 represent means for controlling the processor 1922 to perform steps of the method of the invention. The processor in combination with the instructions provide a means of performing the various operations. When executed by processor 1922, the form processing module 1918 causes at least some form data to be processed by the processor 1922 in accordance with a method of the present invention. The resulting form data is stored in memory 1916 for future use or additional processing or output, e.g., to display device 1902 to be displayed. The memory 1916 includes a blank form 1920, filled-in form 1923, virtual filled-in form 1924, a completed virtual filled-in form 1926 and form statistics 1921. The blank form 1920 includes pixel values corresponding to the content of a blank form. Filled-in form 1923 includes pixel values corresponding to digitized, e.g., scanned, form which includes information that was added to a blank form. Virtual filled-in form 1924 is a virtual form generated in accordance with the invention which includes pixel values extracted from a filled-in form and which have been arranged to correspond to locations in a blank form which the virtual filled-in form is indicated to correspond to, e.g., by a blank form identifier stored in the virtual filled-in form 1924. Completed virtual filled-in form 1926 includes the content of a blank form and the information content of a filled-in form with the filled-in form being the same size as a corresponding blank form. While a single form 1920, 1923, 1924, 1926 of each type is shown, it is to be understood that multiple forms of each type may be stored in memory 1916 at any point in time. In fact, a set of blank forms 1920 are normally evaluated in accordance with the invention to identify a blank form which correspond to a filled-in form 1923. Statistics such as information on foreground pixel distribution, image size, error values, global and block offsets, etc, generated in accordance with the invention are stored in the form statistics portion of memory 1916 and used during various stages of processing implemented in accordance with the invention.

While various numbers, e.g., error values, are used in computing errors in the flow charts described herein, these numbers are exemplary and other numbers could be used. The error thresholds used to determine whether a filled-in form does not match a particular blank form may depend on the error values assigned particular errors. However, since the error values attributed to certain types of errors will be known prior to implementation, corresponding thresholds which are appropriate may also be determined prior to implementation in many cases. While many error thresholds are predetermined, some error thresholds can be determined during processing based on actual errors which are encountered. Accordingly, some error thresholds may be dynamically determined. Block related error thresholds which are determined relative to the errors encountered in adjacent blocks may, and sometimes are, dynamically determined.

Various features of the present invention are implemented using modules. Such modules may be implemented using software, hardware or a combination of software and hardware. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A method of processing a filled-in form and a blank form to generate a virtual filled-in form, the filled-in form including a first plurality of pixel values, each of the first plurality of pixel values corresponding to one location in a first array of row and column pixel locations, the blank form including a second plurality of pixel values, each of the second plurality of pixel values corresponding to one location in a second array of row and column pixel locations, the method comprising:

processing the filled-in form to identify column borders defining a region in which a first predetermined majority of foreground pixel values are located;

processing the filled-in form to identify row borders defining a region in which a second predetermined majority of foreground pixel values are located, wherein the identified column and row borders define a rectangular filled-in main image region;

determining a main image aspect ratio as a function of the determined row and column borders;

comparing the determined main image aspect ratio of the filled-in form to a main aspect ratio of said blank form to determine if the determined main image aspect ratio is within a predetermined difference threshold of the main aspect ration of said blank form; and if it is determined that the aspect ratios are within the predetermined difference threshold, determining a scaling factor which can be used on one of the blank and filled-in forms to resize the main image area of one of the blank and filled-in forms so that the size of the main image area of the blank form and main image area of the filled-in form will match.

2. The method of claim 1, further comprising:

if it is determined that the main image aspect ratio of the filled-in form is outside the predetermined difference when compared to said blank form main image aspect ratio rejecting said blank form as a possible match to the filled-in form.

3. The method of claim 1, wherein the step of processing the filled-in form to identify column borders defining a region in which a first predetermined majority of foreground pixel values are located includes:

generating at least one one-dimensional histogram based on the distribution of foreground pixels in said filled-in form.

4. The method of claim 1, further comprising:

calculating a global offset indicating a displacement between the main image area of said blank form and the main image area of said filled-in form, said global offset indicating a displacement in terms of row and column offsets which, when applied to one of the images, can be used to make the two main image areas correspond to the same row and column locations after one of the images has been scaled so that the two main image areas are the same size.

5. The method of claim 4, wherein said blank form pixel values are grouped into rectangular blocks, the method further comprising:

for each block of the blank form, generating a block position offset indicating a block position offset which tends to minimize a total block error corresponding to the individual block, the block error being indicative of a location error that exists between the position of the block in the blank form and a set of pixel values in the filled-in form determined to correspond to said particular block based on at least a similarity of pixel values in said block and said set of pixel values in the filled-in form.

6. The method of claim 5, wherein the total block error for each individual block is determined as a function of i) a block offset determined for the particular individual block, said block offset being in addition to said global offset and indicating a position shift to be used to map between the position of said block in the blank form and the position of the corresponding set of pixel values in the filled-in form, and ii) when a previously determined block offset for an adjacent block is available, the variance between the block offset of the particular block and the previously determined block offset of the adjacent block.

7. The method of claim 5, further comprising:
generating a virtual form from the filled-in form by mapping pixel values of the filled-in form to locations within the virtual form by applying position offsets determined from at least said global offset and the individual block offset for a block to which the pixel values in the filled-in form was determined to correspond.

8. The method of claim 7, wherein said generating of the virtual form includes setting a pixel value in said virtual filled-in form corresponding to a particular location to a foreground pixel value when a foreground pixel value in said filled-in form and a background pixel value in the blank form map to said particular location.

9. The method of claim 8, wherein said combining operation produces a foreground pixel values in said filled-in form only in locations to which a foreground pixel value is mapped from said filled-in form and a background pixel value is mapped from said blank form, the method further comprising:
storing the pixel values of said virtual form in a storage device along with information indicating the blank form to which said virtual form corresponds; and
generating a complete virtual filled-in form by combining pixel values from said blank form and pixel values from said virtual filled-in form, said complete virtual filled-in form including a foreground pixel value in any pixel value location in which either said blank form or said virtual filled-in form include a foreground pixel value.

10. The method of claim 5, wherein the total error of a block is determined as a function of a plurality of different types of errors, said plurality of different types of errors including a first type error which is based on at least the distance between the location in said blank form of at least one foreground pixel value and the proximity of a foreground pixel value, if present, in the corresponding set of pixel values in the filled-in form.

11. The method of claim 10, wherein the total block error is also a function of a second type error, the second type error being determined to occur when a foreground pixel in the filled-in form is determined to correspond to a location in the blank form which includes a background pixel.

12. The method of claim 11, wherein the first type error is weighted more heavily than the second type error when computing the total block error, the total block error being incremented more when a first type error is detected than when a second type error is detected.

13. The method of claim 10, further comprising:
sequentially determining total block error for multiple blocks in said blank form;
maintaining a cumulative first type error count indicative of the number of first type errors which are detected; and
determining a form mismatch between the blank form and the filled-in form if the cumulative error count exceeds an error threshold.

14. The method of claim 10, further comprising:
sequentially determining total block error for multiple blocks in said blank form;
maintaining a cumulative total block error count; and
determining a form mismatch between the blank form and the filled-in form if the cumulative total block error count exceeds an error threshold.

15. The method of claim 1, wherein said method is implemented by a general purpose processor operating under control of a set of program instructions, said program instructions being stored on a machine readable medium.

16. A system for processing a filled-in form and a blank form to generate a virtual filled-in form, the filled-in form including a first plurality of pixel values, each of the first plurality of pixel values corresponding to one location in a first array of row and column pixel locations, the blank form including a second plurality of pixel values, each of the second plurality of pixel values corresponding to one location in a second array of row and column pixel locations, the system comprising:
means for processing the filled-in form to identify column borders defining a region in which a first predetermined majority of foreground pixel values are located;
means for processing the filled-in form to identify row borders defining a region in which a second predetermined majority of foreground pixel values are located, wherein the identified column and row borders define a rectangular filled-in main image region;
means for determining a main image aspect ratio as a function of the determined row and column borders;
means for comparing the determined main image aspect ratio of the filled-in form to a main aspect ratio of said blank form to determine if the determined main image aspect ratio is within a predetermined difference threshold of the main aspect ration of said blank form; and
means for determining a scaling factor which can be used on one of the blank and filled-in forms to resize the main image area of one of the blank and filled-in forms so that the size of the main image area of the blank form and main image area of the filled-in form will match if it is determined that the aspect ratios are within the predetermined difference threshold.

17. The system of claim 16, further comprising:
means for rejecting said blank form as a possible match to the filled-in form if it is determined that the main image aspect ratio of the filled-in form is outside the predetermined difference when compared to said blank form main image aspect ratio.

18. A method of determining if a blank form matches a filled-in form, the blank and filled-in form having a plurality of corresponding regions, the method comprising:
comparing corresponding regions of the blank form and filled-in form to detect a plurality of different types of errors including:
first type errors in which one or more foreground pixel values in the blank form which are not present within a predetermined distance of one or more foreground pixel values in a corresponding region of a filled-in form;
second type errors in which one or more foreground pixel values in the filled-in form are not present within a predetermined distance of a foreground pixel value in a corresponding region of the blank form; and generating a form mismatch estimate value indicative of the mismatch between the blank form and the filled-in form as a function of detected first type errors and second type errors.

19. The method of claim 18, wherein said step of generating an estimate of the mismatch between the blank form and the filled-in form includes:
weighting first type errors more heavily than second type errors thereby resulting in each first type error contributing more heavily to the total mismatch error estimate value than each detected second type error.

20. The method of claim 19, further comprising:
generating a signal indicating a mismatch between the blank form and filled-in form when the generated mismatch error estimate value exceeds a maximum total error threshold value.

21. The method of claim 20, wherein said form mismatch estimate value is generated by sequentially processing corresponding regions of said blank form and said filled-in form.

22. A method of processing a filled-in form and a blank form to generate a virtual filled-in form, the filled-in form including a first plurality of pixel values, each of the first plurality of pixel values corresponding to one location in a first array of row and column pixel locations, the blank form including a second plurality of pixel values, each of the second plurality of pixel values corresponding to one location in a second array of row and column pixel locations, wherein said blank form pixel values are grouped into rectangular blocks, each of the blank form and filled-in forms including main image areas in which a majority of the foreground pixels in the form are located, the method comprising:
calculating a global offset indicating a displacement between the main image area of said blank form and the main image area of said filled-in form, said global offset indicating a displacement in terms of row and column offsets which, when applied to one of the images, can be used to make the two main image areas correspond to the same row and column locations after one of the images has been scaled so that the two main image areas are the same size; and
for each block of the blank form, generating a block position offset indicating a block position offset which tends to minimize a total block error corresponding to the individual block, the block error being indicative of a location error that exists between the position of the block in the blank form and a set of pixel values in the filled-in form determined to correspond to said particular block based on at least a similarity of pixel values in said block and said set of pixel values in the filled-in form.

23. The method of claim 22, wherein the total block error for each individual block is determined as a function of i) a block offset determined for the particular individual block, said block offset being in addition to said global offset and indicating a position shift to be used to map between the position of said block in the blank form and the position of the corresponding set of pixel values in the filled-in form, and ii) when a previously determined block offset for an adjacent block is available, the variance between the block offset of the particular block and the previously determined block offset of the adjacent block.

24. The method of claim 22, further comprising:
generating a virtual form from the filled-in form by mapping pixel values of the filled-in form to locations within the virtual form by applying position offsets determined from at least said global offset and the individual block offset for a block to which the pixel values in the filled-in form was determined to correspond.

25. A machine readable medium comprising machine executable instructions which, when executed cause a machine to perform processing of a filled-in form and a blank form to generate a virtual filled-in form, the filled-in form including a first plurality of pixel values, each of the first plurality of pixel values corresponding to one location in a first array of row and column pixel locations, the blank form including a second plurality of pixel values, each of the second plurality of pixel values corresponding to one location in a second array of row and column pixel locations, the processing including the steps of:
processing the filled-in form to identify column borders defining a region in which a first predetermined majority of foreground pixel values are located;
processing the filled-in form to identify row borders defining a region in which a second predetermined majority of foreground pixel values are located, wherein the identified column and row borders define a rectangular filled-in main image region;
determining a main image aspect ratio as a function of the determined row and column borders;
comparing the determined main image aspect ratio of the filled-in form to a main aspect ratio of said blank form to determine if the determined main image aspect ratio is within a predetermined difference threshold of the main aspect ration of said blank form; and
if it is determined that the aspect ratios are within the predetermined difference threshold, determining a scaling factor which can be used on one of the blank and filled-in forms to resize the main image area of one of the blank and filled-in forms so that the size of the main image area of the blank form and main image area of the filled-in form will match.

* * * * *